(12) United States Patent
Liu et al.

(10) Patent No.: US 12,177,156 B2
(45) Date of Patent: Dec. 24, 2024

(54) ACKNOWLEDGEMENT INFORMATION FOR WIRELESS COMMUNICATION NETWORK

(71) Applicant: Telefonaktiebolaget LM Ericsson (publ), Stockholm (SE)

(72) Inventors: Yuhang Liu, Lund (SE); Stephen Grant, Pleasanton, CA (US); Jung-Fu Cheng, Fremont, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 145 days.

(21) Appl. No.: 17/396,458

(22) Filed: Aug. 6, 2021

(65) Prior Publication Data

US 2023/0039107 A1 Feb. 9, 2023

(51) Int. Cl.
*H04L 5/00* (2006.01)
*H04L 1/16* (2023.01)
*H04L 1/1607* (2023.01)

(52) U.S. Cl.
CPC .......... *H04L 5/0055* (2013.01); *H04L 1/1642* (2013.01)

(58) Field of Classification Search
CPC ... H04L 5/0055; H04L 1/1642; H04L 1/0073; H04L 1/1607; H04L 1/0057
See application file for complete search history.

(56) References Cited

U.S. PATENT DOCUMENTS

| | | | | |
|---|---|---|---|---|
| 10,312,948 B1* | 6/2019 | Arikan | ................... | H04L 1/1819 |
| 2015/0201326 A1* | 7/2015 | Kazmi | ................... | H04W 8/24 |
| | | | | 370/329 |
| 2019/0246395 A1* | 8/2019 | Huang | ................... | H04W 72/12 |
| 2019/0260516 A1* | 8/2019 | Baldemair | ............ | H04L 1/1671 |
| 2019/0372704 A1 | 12/2019 | Wang et al. | | |
| 2020/0092048 A1* | 3/2020 | Hong | ................... | H04L 5/0055 |
| 2020/0314898 A1* | 10/2020 | Sun | ....................... | H04L 5/0048 |
| 2021/0006375 A1* | 1/2021 | Takeda | ................... | H04L 1/1671 |
| 2021/0084622 A1 | 3/2021 | Choi et al. | | |

(Continued)

FOREIGN PATENT DOCUMENTS

| | | |
|---|---|---|
| TW | 202101931 A | 1/2021 |
| WO | WO-2019050443 A1 * 3/2019 | ........... H04L 1/1614 |

(Continued)

OTHER PUBLICATIONS

3GPP TS 38.212 V16.4.0; 3rd Generation Partnership Project; Technical Specification Group Radio Access Network; NR; Multiplexing and channel coding (Release 16); Dec. 2020, consisting of 152 pages.

(Continued)

*Primary Examiner* — Hoang-Chuong Q Vu
(74) *Attorney, Agent, or Firm* — Weisberg I.P. Law, P.A.

(57) ABSTRACT

There is disclosed a method of operating a feedback radio node in a radio access network. The method includes transmitting feedback signalling representing an encoded sequence of bits, the encoded sequence of bits representing a sequence of feedback information bits, the sequence of feedback information bits comprising a plurality of subpatterns, each subpattern having a type of a set of types. The set of types has a first type and a second type, the subpatterns being ordered in the sequence according to their type. The disclosure also pertains to related devices and methods.

19 Claims, 6 Drawing Sheets

(56) References Cited

U.S. PATENT DOCUMENTS

| | | | |
|---|---|---|---|
| 2021/0328716 A1* | 10/2021 | Noh | H04W 4/46 |
| 2022/0029758 A1* | 1/2022 | Bae | H04L 5/0033 |
| 2022/0046667 A1* | 2/2022 | Sun | H04L 1/1887 |
| 2022/0369336 A1* | 11/2022 | Huang | H04L 1/0008 |
| 2023/0155731 A1* | 5/2023 | Baldemair | H04L 1/0072 370/328 |
| 2023/0291504 A1* | 9/2023 | Cheng | H04L 1/1812 370/329 |
| 2024/0204923 A1* | 6/2024 | Yuan | H04L 1/1861 |

FOREIGN PATENT DOCUMENTS

| | | | | |
|---|---|---|---|---|
| WO | 2019073384 A1 | 4/2019 | | |
| WO | 2019099319 A1 | 5/2019 | | |
| WO | WO-2019098896 A1 * | 5/2019 | | H04B 7/0478 |
| WO | WO-2019160457 A1 * | 8/2019 | | H04L 1/1614 |

OTHER PUBLICATIONS

Hui et al. "Channel Coding in 5G New Radio" IEEE Vehicular Technology Magazine 1556-6072/18; Dec. 2018, consisting of 10 pages.

3GPP TSG RAN WG1 Meeting #106-e R1-210xxxx; Title: Draft Report of 3GPP TSG RAN WG1 #105-e v0.2.0 (Online meeting, May 10-27, 2021); Source: MCC Support; Document for: Comments; Location and Date: e-Meeting, Aug. 16-27, 2021, consisting of 141 pages.

Taiwan Office Action and English Summary dated Jan. 16, 2023 for Application No. 110135466, consisting of 12 pages.

International Search Report and Written Opinion dated Apr. 13, 2022, for International Application No. PCT/SE2021/050932, filed on Sep. 24, 2021, consisting of 17 pages.

3GPP TSG RAN WG1 Meeting 91 R1-1719744; Title: On HARQ-ACK multiplexing and bundling; Agenda Item: 7.3.3.2; Source: Lenovo, Motorola Mobility; Document for: Discussion and decision; Location and Date: Reno, USA, Nov. 27-Dec. 1, 2017, consisting of 4 pages.

3GPP TSG RAN WG1 Meeting #93 R1-1806609; Title: Remaining issues on CSI reporting; Agenda item: 7.1.2.2.2; Source: LG Electronics; Document for: Discussion and Decision; Location and Date: Busan, Korea, May 21-25, 2018, consisting of 11 pages.

3GPP TSG-RAN WG1 Meeting #106-bis-e Tdoc R1-2109438; Title: PDSCH/PUSCH enhancements; Agenda Item: 8.2.5; Source: Ericsson; Document for: Discussion, Decision; Location and Date: e-Meeting, Oct. 11-19, 2021, consisting of 62 pages.

* cited by examiner

ACKNOWLEDGEMENT INFORMATION FOR WIRELESS COMMUNICATION NETWORK

TECHNICAL FIELD

This disclosure pertains to wireless communication technology, in particular for high frequencies.

BACKGROUND

For current and future wireless communication systems, increasing data throughputs are considered, e.g., by scheduling multiple data transmissions with on control information message. Associated acknowledgement processes (for example, to handle error cases and/or achieve desired signal quality, e.g., in terms of BLER or BER) become increasingly complex, in particular in the context of processing and transmission of the acknowledgement signalling.

SUMMARY

It is an object of this disclosure to provide improved approaches of handling wireless communication, in particular regarding acknowledgement information. The approaches described are particularly suitable for millimeter wave communication, in particular for radio carrier frequencies around and/or above 52.6 GHz, which may be considered high radio frequencies (high frequency) and/or millimeter waves. The carrier frequency/ies may be between 52.6 and 140 GHz, e.g., with a lower border between 52.6, 55, 60, 71 GHz and/or a higher border between 71, 72, 90, 114, 140 GHz or higher, in particular between 55 and 90 GHz, or between 60 and 72 GHz; however, higher frequencies may be considered, in particular frequency of 71 GHz or 72 GHz or above, and/or 100 GHz or above, and/or 140 GHz or above. The carrier frequency may in particular refer to a center frequency or maximum frequency of the carrier. The radio nodes and/or network described herein may operate in wideband, e.g., with a carrier bandwidth of 1 GHz or more, or 2 GHz or more, or even larger, e.g., up to 8 GHz; the scheduled or allocated bandwidth may be the carrier bandwidth, or be smaller, e.g., depending on channel and/or procedure. In some cases, operation may be based on an OFDM waveform or a SC-FDM (also referred to as DFT-s-waveform), for example for downlink and/or uplink, in particular a FDF-SC-FDM-based waveform. However, operation based on a single carrier waveform, e.g., SC-FDE (which may be pulse-shaped or Frequency Domain Filtered, e.g., based on modulation scheme and/or MCS), may be considered for downlink and/or uplink. In general, different waveforms may be used for different communication directions.

Communicating using or utilising a carrier and/or beam may correspond to operating using or utilising the carrier and/or beam, and/or may comprise transmitting on the carrier and/or beam and/or receiving on the carrier and/or beam. Operation may be based on and/or associated to a numerology, which may indicate a subcarrier spacing and/or duration of an allocation unit and/or an equivalent thereof, e.g., in comparison to an OFDM based system. A subcarrier spacing or equivalent frequency interval may for example correspond to 960 kHZ, or 1920 kHz, e.g., representing the bandwidth of a subcarrier or equivalent.

The approaches are particularly advantageously implemented in a future 5G or 6th Generation (6G) telecommunication network or 6G radio access technology or network (RAT/RAN), in particular according to 3GPP ($3^{rd}$ Generation Partnership Project, a standardisation organization). A suitable RAN may in particular be a RAN according to NR, for example release 17 or later, or LTE Evolution. However, the approaches may also be used with other RAT, for example future 5.5G systems or IEEE based systems.

It may be considered that the RAN and/or a radio node is operating in an unlicensed frequency band (or carrier or part thereof, also referred to as license-exempt) and/or based on a LBT or channel assessment procedure to access (for transmission) the frequency band (or carrier or part thereof), for example in a License Assisted Access (LAA) operation mode and/or in the context of NR-U (NR unlicensed).

There is disclosed a method of operating a feedback radio node in a radio access network. The method comprises transmitting feedback signalling representing an encoded sequence of bits. The encoded sequence of bits represents and/or is based on and/or encodes a sequence of feedback information bits. The sequence of feedback information bits comprises a plurality of subpatterns, each subpattern having and/or representing and/or being based on a type of a set of types. The set of types comprises and/or consist of and/or encompasses and/or includes a first type and a second type. The subpatterns are ordered and/or arranged and/or located in the sequence according to and/or based on and/or corresponding to their type.

A feedback radio node for a radio access network is considered, the feedback radio node being adapted for transmitting feedback signalling representing an encoded sequence of bits. The encoded sequence of bits represents and/or is based on and/or encodes a sequence of feedback information bits. The sequence of feedback information bits comprises a plurality of subpatterns, each subpattern having and/or representing and/or being based on a type of a set of types. The set of types comprises and/or consist of and/or encompasses and/or includes a first type and a second type. The subpatterns are ordered and/or arranged and/or located in the sequence according to and/or based on and/or corresponding to their type.

Moreover, a method of operating a signalling radio node in a radio access network is proposed. The method comprises receiving feedback signalling representing an encoded sequence of bits. The encoded sequence of bits represents and/or is based on and/or encodes a sequence of feedback information bits. The sequence of feedback information bits comprises a plurality of subpatterns, each subpattern having and/or representing and/or being based on a type of a set of types. The set of types comprises and/or consist of and/or encompasses and/or includes a first type and a second type. The subpatterns are ordered and/or arranged and/or located in the sequence according to and/or based on and/or corresponding to their type.

A signalling radio node for a radio access network is discussed. The signalling radio node is adapted for receiving feedback signalling representing an encoded sequence of bits. The encoded sequence of bits represents and/or is based on and/or encodes a sequence of feedback information bits. The sequence of feedback information bits comprises a plurality of subpatterns, each subpattern having and/or representing and/or being based on a type of a set of types. The set of types comprises and/or consist of and/or encompasses and/or includes a first type and a second type. The subpatterns are ordered and/or arranged and/or located in the sequence according to and/or based on and/or corresponding to their type.

Transmitting feedback signalling may comprise and/or be based on modulating and/or processing and/or encoding and/or determining the feedback information. Transmitting feedback signalling may be based on and/or in response to and/or pertain to subject transmission and/or control signalling scheduling subject transmission, e.g., one or more scheduling assignments. Receiving the feedback signalling may comprise demodulating and/or processing and/or decoding. Receiving feedback signalling may comprise transmitting signalling based on and/or in response to the feedback signalling, e.g., retransmitting subject transmission and/or transmitting new subject transmission (like data) and/or performing link adaption. The feedback information may be acknowledgement information like HARQ feedback and/or measurement information. It may be considered that feedback information is control information, in particular Uplink Control Information (UCI) or Sidelink Control Information (SCI). The feedback signalling may be transmitted on, and/or associated to a channel, in particular a physical control channel or data channel, e.g., PUCCH or PUSCH or PSCCH or PSSCH. A subpattern may comprise one or more bits. Different subpatterns may have different, or the same, number of bits. Coding may be used for determining the encoded sequence of bits, e.g., based on the sequence of feedback information bits, for example forward error coding (or error correction coding) like Polar coding or LDPC coding. The sequence of feedback information bits may comprise error detection coding bits, e.g., bits for CRC, which may be based on and/or indicative of information bits of the feedback information (the sequence). Information bits of the sequence of feedback information bits may comprise bits representing acknowledgement information and/or measurement information. In general, the encoded sequence of bits may be based on the sequence of information bits, and/or a configuration of control signalling (e.g., the format for scheduling assignment, e.g., the maximum number of subject transmissions schedulable by one scheduling assignment, and/or maximum size of a subpattern to be scheduled), and/or a scheduling counter like a DAI (e.g., counter DAI or total DAI or uplink DAI), e.g., included in a control information message, which may be received by the feedback radio node and/or based on which the feedback signalling is transmitted.

In general, a subpattern may be considered associated to a scheduling assignment or a control information message or control signalling, if such is subject transmission the subpattern pertains to, or subject transmission scheduled by such, or for which subject transmission may be schedulable (e.g., according to a configuration) but did not happen. In general, the sequence of feedback information bits may be considered an input for coding, which may provide the encoded sequence of bits as output. Different scheduling assignments may schedule the same, or different, numbers of subject transmissions. The maximum number of subject transmissions schedulable by a single scheduling assignment may be predefined, or configured or configurable; it may be the same or different for different scheduling assignments of types or formats of scheduling assignments.

Approaches described herein may facilitate improved feedback signalling, in particular regarding reliability and/or decoding performance. In particular, a type of subpattern corresponding to padding bits may be arranged for optimised coding. It may be considered mapping low priority information and/or known information (e.g., due to schedulable, but not scheduled subject transmission) in an optimised manner to the feedback information bit sequence, e.g., considering characteristics of the coding used, in particular of non-systematic coding and/or polar coding.

In general, it may be considered that the sequence of feedback information bits is based on a base sequence of bits (or on a plurality of base sequences). The base sequence may comprise the subpatterns of the sequence of information bits in a different order, e.g., such that subpatterns associated to the same scheduling assignment are grouped together sequentially (e.g., in one or a single subsequence); in some cases, a base sequence may consist of the subpatterns associated to a single or the same scheduling assignment. The sequence of information bits may be based on the base sequence/s based on one or more bit operations, e.g., reversing and/or interleaving and/or concatenation.

It may be considered that the encoded sequence of bits may be longer than the sequence of feedback information bits. Thus, error protection for improved signal quality may be provided.

In some variants, the encoded sequence of bits may be based on a non-systematic coding applied on the sequence of feedback information bits. The non-systematic coding may be FEC coding and/or error correction coding, in particular Polar coding, or Reed-Muller or turbo-coding (or mathematically equivalent). In general, in a systematic coding, the input bits to be encoded (e.g., information bits and/or error detection coding bits) may be embedded in the encoded bits receive as output of the coding; in non-systematic coding, this may not be the case. An encoded sequence of bits representing and/or encoded with Polar coding may comprise fixed or "frozen" bits and non-frozen bits; feedback information bits may be mapped or mappable to, and/or represented by, or correspond to, the non-frozen bits.

The encoded sequence of bits may have an order (e.g., first to last); different signal quality (e.g., reliability) may be associated to different places (order) in the sequence. In particular, later in the sequence may correspond to higher reliability, e.g., in Polar coding.

It may be considered that (e.g., all, or one or more) subpatterns of the first type may be arranged before (e.g., all, or one or more) subpatterns of the second type in the sequence of feedback information bits. Thus, an arrangement according to the type collecting subpatterns of a type in a group may be arranged. It may be considered that in general, subpatterns of one type are grouped together in a sequence (e.g., such that all subpatterns of on type neighbour at least one subpattern of the same type, and/or sequentially, e.g., in one or a single subsequence, in the sequence). This may facilitate optimised mapping to encoded bits and/or encoding.

In particular, it may be considered that the first type may correspond to padding bit/s and/or subpatterns). A padding bit may be a bit filling a position of feedback for schedulable subject transmission that has not been scheduled, e.g., in the context of scheduling of multiple data (e.g., on PDSCH) with one DCI (scheduling assignment).

In some variants, the feedback information bits may represent a codebook. The codebook may be an acknowledgement information codebook, e.g., a dynamic codebook and/or a HARQ codebook, in particular a Type-2 HARQ codebook. The codebook may pertain to scheduling with one or more scheduling assignments (e.g., DCI), wherein at least one and/or each assignment may be configured and/or suitable for scheduling a plurality of subject transmissions, in particular of data signalling instances (considered as subject transmissions), for example on a data channel like PDSCH; different instances may be associated to different acknowledgement processes, e.g., different data streams and/or process identifiers, e.g., HARQ IDs or ARQ IDs.

It may be considered that the subpatterns are ordered in the sequence of feedback bits based on a coding. For example, if coding of different sizes (e.g., Polar coding of different sizes) are used, different orders or mappings to map feedback information bits to encoded bits may be used, and/or for different coding types, e.g., systematic or non-systematic (e.g., LDPC or Polar, or table-based coding for 5 or less or 3 or less or Polar coding), different ordering or mapping of the subpatterns may be used.

In some variants, one or more subpatterns of one type (e.g., padding) may be associated to different scheduling assignments. Alternatively, or additionally, at least one subpattern associated to one scheduling assignment may have the first type, and at least one subpattern associated to the (same) scheduling assignment may have the second type. This may in particular lead to subpatterns of one scheduling assignment being located and/or grouped apart in the sequence of feedback information bits.

Processing of or for signalling may comprise modulating, and/or coding, and/or mapping the signalling and/or symbols thereof, e.g., for transmitting, or analogous for receiving. Alternatively, processing of signalling may comprise performing a channel estimation and/or demodulation and/or decoding, e.g., based on channel estimation. Processing may comprise determining a measurement report based on a channel estimation, e.g., for transmitting the measurement report.

In general, a wireless device and/or network node may operate in, and/or the communication and/or signalling may be in, TDD operation. It should be noted that the transmission of signalling from transmission sources may be synchronised and simultaneous; a shift in time may occur due to different propagation times, e.g., due to different beams and/or source locations.

A wireless device and/or feedback radio node (a wireless device may be considered an example for a feedback radio node), may in general comprise, and/or be adapted to utilise, processing circuitry and/or radio circuitry, in particular a transmitter and/or transceiver and/o receiver, to process (e.g., trigger and/or schedule) and/or transmit and/or receive signalling like data signalling and/or control signalling like acknowledgement signalling and/or reference signalling. A wireless device or feedback radio node may be implemented as terminal or UE; in some cases, it may however be implemented as network node, in particular a base station or relay node or IAB node, in particular to provide MT (Mobile Termination) functionality for such. In general, a wireless device of feedback radio node may comprise and/or be adapted for transmission diversity, and/or may be connected or connectable to, and/or comprise, antenna circuitry, and/or two or more independently operable or controllable antenna arrays or arrangements, and/or transmitter circuitries and/or antenna circuitries, and/or may be adapted to use (e.g., simultaneously) a plurality of antenna ports (e.g., for transmitting first signalling and second signalling), e.g., controlling transmission using the antenna array/s, and/or to utilise and/or operate and/or control two or more transmission sources, to which it may be connected or connectable, or which it may comprise. The feedback radio node may comprise multiple components and/or transmitters and/or transmission sources and/or TRPs (and/or be connected or connectable thereto) and/or be adapted to control transmission from such. Any combination of units and/or devices able to control transmission on an air interface and/or in radio as described herein may be considered a feedback radio node. In general, a feedback radio node may be a radio node adapted for, and/or capable of, transmitting feedback signalling, in particular acknowledgement signalling, and/or for receiving or being scheduled with subject transmission/s (based on which feedback signalling may be transmitted).

A signalling radio node and/or network node (a network node may be considered an example of a signalling radio node) may comprise, and/or be adapted to utilise, processing circuitry and/or radio circuitry, in particular a receiver and/or transmitter and/or transceiver, to transmit and/or to process and/or receive (e.g., receive and/or demodulate and/or decode and/or perform blind detection and/or schedule or trigger) data signalling and/or control signalling and/or reference signalling, in particular first signalling and second signalling. Receiving may comprise scanning a frequency range (e.g., a carrier) for reference signalling and/or control signalling, e.g., at specific (e.g., predefined and/or configured) locations in time/frequency domain, which may be dependent on the carrier and/or system bandwidth. Such location/s may correspond to one or more location or resource allocations configured or indicated or scheduled or allocated to a feedback radio node, e.g., scheduled dynamically, or configured, e.g., with DCI and/or RRC signalling, e.g., for transmission on resources allocated for data signalling. In some cases, a signalling radio node may be a network node or base station or TRP, or may be an IAB node or relay node, e.g., providing control level functionality for such, e.g., DU and/or CU functionality. In some cases, e.g., sidelink scenarios, a signalling radio node may be implemented as a wireless device or terminal or UE. A signalling radio node or network node may comprise one or more independently operable or controllable receiving or transmitting circuitries and/or antenna circuitries and/or may be adapted to utilise and/or operate to receive from one or more transmission source simultaneously and/or separately (in time domain), and/or to operate using (e.g., receiving or transmitting) two or more antenna ports simultaneously, and/or may be connected and/or connectable and/or comprise multiple independently operable or controllable antennas or antenna arrays or subarrays. A signalling radio node may in general be a radio node adapted for transmitting subject transmission and/or scheduling subject transmission.

An allocation unit may be considered to be associated to reference signalling or a reference signalling sequence if it carries at least a component of the reference signalling (e.g., a component of reference signalling is transmitted on the allocation unit). An allocation unit may in particular represent a time interval, e.g., a block symbol or the duration of a SC-FDM symbol, or OFDM symbol or equivalent, and/or may be based on the numerology used for the synchronisation signalling, and/or may represent a predefined time interval. The duration (in time domain) of an allocation unit may be associated to a bandwidth in frequency domain, e.g., a subcarrier spacing or equivalent, e.g., a minimum usable bandwidth and/or a bandwidth of an allocation unit. It may be considered that signalling spanning an allocation unit corresponds to the allocation unit (time interval) carrying the signalling and/or signalling being transmitted (or received) in the allocation unit. Transmission of signalling and reception of signalling may be related in time by a path travel delay the signalling requires to travel from the transmitter to receiver (it may be assumed that the general arrangement in time is constant, with path delay/multi path effects having limited effect on the general arrangement of signalling in time domain). Allocation units associated to different signalings, e.g., different reference signalings, in particular on different ports or TPs. may be considered to be associated to each other and/or correspond to each other if they correspond to the same number of allocation unit within a reference signalling transmission time interval, and/or if they are synchronised to each other and/or are simultaneous, e.g., in two simultaneous transmissions. Similar reasoning may pertain to a transmission time interval; the same interval for two signalings may be the intervals having the same number and/or relative location in the frame or timing structure associated to each signalling.

There is also described a program product comprising instructions causing processing circuitry to control and/or perform a method as described herein.

Moreover, a carrier medium arrangement carrying and/or storing a program product as described herein is considered. An information system comprising, and/or connected or connectable, to a radio node is also disclosed.

BRIEF DESCRIPTION OF THE DRAWINGS

The drawings are provided to illustrate concepts and approaches described herein, and are not intended to limit their scope. The drawings comprise.

DETAILED DESCRIPTION

In the following, concepts are explained with reference to NR. However, the concepts and approaches may be applicable to other systems and technology. A DCI may be considered an example of a control information message and/or a scheduling assignment, e.g., if it schedules one or more subject transmissions, in particular one or more PDSCH instances or transmissions.

Polar codes, originally proposed by Arikan, are the first class of constructive channel codes that was proven to achieve the symmetric (Shannon) capacity of a binary-input discrete memoryless channel using a low-complexity decoder, particularly, a successive cancelation (SC) decoder. Polar coding transforms a pair of identical binary-input channels into two distinct channels of different qualities: one better and one worse than the original binary-input channel. By repeating such a pairwise Polarizing operation on a set of $N=2^n$ independent uses of a binary-input channel, a set of $2^n$ bit-channels of varying qualities, in terms of the reliability in communicating a single bit, can be obtained for any given integer n. When n is large, some of these bit channels are nearly perfect (i.e., error-free) while the rest of them are nearly useless (i.e., totally noisy). The idea is to use the nearly perfect channels to transmit data to the receiver while setting the input to the useless channels to have fixed or frozen values (e.g., zero) that are known to the receiver. The input bits to the nearly useless and the nearly perfect bit channels are commonly referred to as frozen bits and non-frozen (or information) bits, respectively. Only the non-frozen bits are used to carry information. The choice of the set of non-frozen bit locations, referred to as the information set, directly affects the performance of a Polar code. In practice, the relative reliabilities of the bit-channels may be sorted in an ascending order and be captured in a sequence of indices termed an information sequence that indicates the order with which the bit-channels should be used to carry data.

Despite their capacity-achieving capability, Polar codes of finite size, when used alone, often exhibit a poor minimum distance property and do not perform well at a high SNR regime even with exhaustive-search maximum likelihood decoding. Concatenation with an outer code, such as a CRC code, together with the use of a successive cancelation list (SCL) decoder, is needed to achieve competitive performance.

Figure 1:
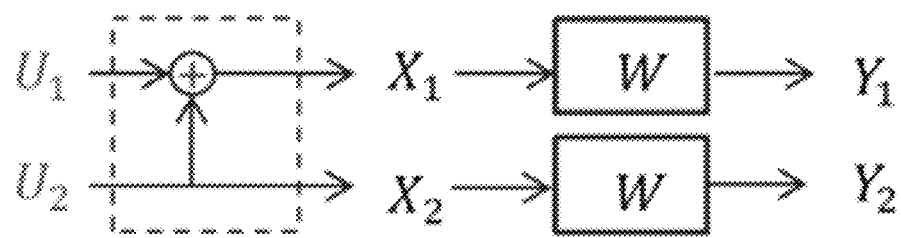
FIG. 1, showing a coding scenario.

FIG. 1 shows an exemplary Polar coding schematic, in particular a basic transform of Polar code. The output of the NR Polar encoding kernel is simply $x=G^{\otimes n}u$, where u is the input to the Polar encoding kernel, G is the 2×2 Arikan kernel matrix corresponding to the basic transform, and $\otimes n$ denotes the n-time Kronecker power.

Figure 2:
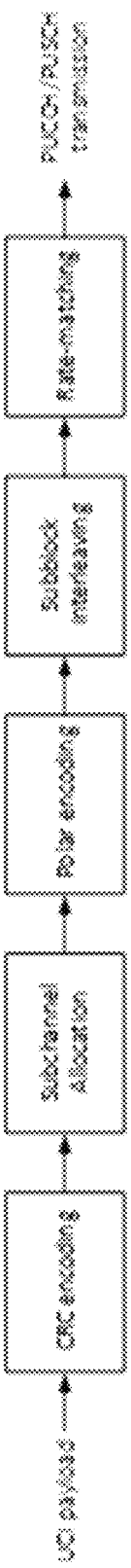
FIG. 2, showing an exemplary processing chain for transmission.

In NR, CRC-assisted Polar coding is used as channel coding for UCI with payload size larger than 11 bits. First of all, a CRC (e.g., 6 or 11 bits) is calculated and appended to the UCI payload bit sequence. Then the information bit sequence (UCI payload bits together with the CRC bits) are mapped to the non-frozen bits of the Polar encoder. The resulting coded bits are then interleaved, rate-matched and transmitted over PUCCH or PUSCH. FIG. 2 schematically shows a corresponding example for a UCI processing chain in NR.

The Polar code length N may be a power of 2. It is determined by the size of the information bits (the UCI payload and CRC bits) and the number of coded bits after rate-matching (M), as well as the constraints on the minimum code rate and maximum code length.

NR defines a Polar sequence $Q_0^{N_{max}-1}=\{Q_0^{N_{max}}, Q_1^{N_{max}}, Q_2^{N_{max}}, \ldots, Q_{N-1}^{N_{max}}\}$, where $0 \leq Q_i^{N_{max}} \leq N_{max}-1$ denotes a bit index before Polar encoding for $i=0, 1, \ldots, N_{max}$ and $N_{max}=1024$. Each Polar bit $Q_i^{N_{max}}$ is associated with an corresponding reliability $W(Q_i^{N_{max}})$. Larger $W(Q_i^{N_{max}})$ value indicates higher reliability for the corresponding Polar bit and vice versa.

For any code block encoded to N bits ($N \leq N_{max}$), a same Polar sequence $Q_0^{N-1}=\{Q_0^N, Q_1^N, Q_2^N, \ldots, Q_{N-1}^N\}$ is used. The Polar sequence $Q_0^{N-1}$ is a subset of Polar sequence $Q_0^{N_{max}}$ with all elements $Q_i^{N_{max}}$ of values less than N, ordered in ascending order of reliability $W(Q_0^N) < W(Q_1^N) < W(Q_2^N) < \ldots < W(Q_{N-1}^N)$.

Figure 3:
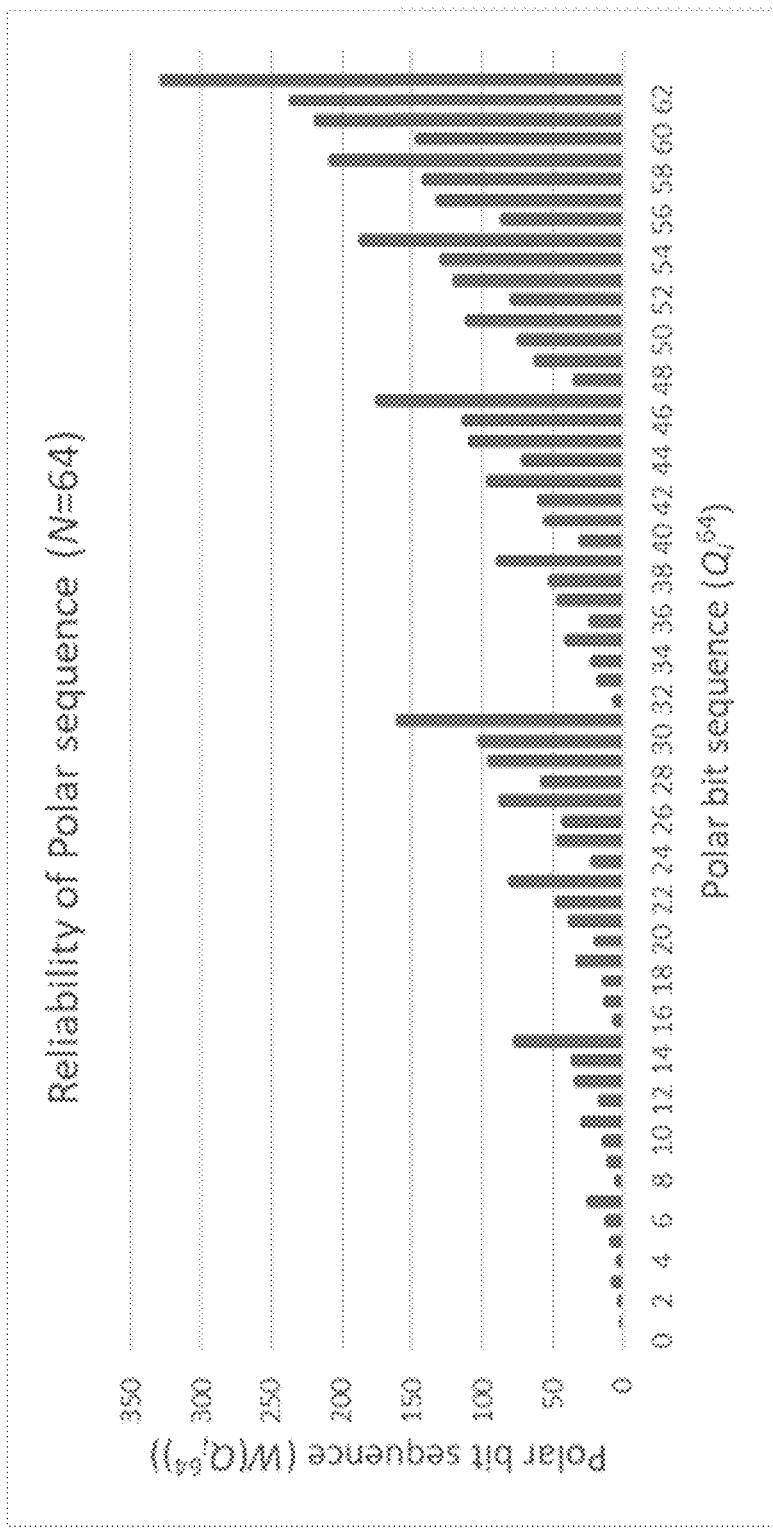
FIG. 3, showing an exemplary Polar coding scenario.

FIG. 3 shows the reliability for a 64-bit Polar sequence. The figure demonstrates the general tendency of the reliability of the Polar bits increasing with the bit indices. Denote the number of information bits (UCI payload bits and the CRC bits) as K. The K Polar bits with the highest reliability ($W(0)$) are chosen as non-frozen bits, on which the information bits are mapped, and the remaining Polar bits are frozen bits.

The procedure for receiving downlink transmission in NR is that the UE first monitors and decodes a PDDCH (e.g., a scheduling assignment) in slot n which points to a DL data scheduled in slot $n+K_0$ slots ($K_0$ is larger than or equal to 0). The UE then decodes the data in the corresponding PDSCH. Based on the outcome of the decoding, the UE sends an acknowledgement of the correct decoding (ACK) or a negative acknowledgement (NACK) to the gNB at time slot $n+K_0+K_1$ (in case of slot aggregation $n+K_0$ would be replaced by the slot where PDSCH ends). Both of $K_0$ and $K_1$ are indicated in the DCI. The resources for sending the acknowledgement are indicated by PUCCH resource indicator (PRI) field in the DCI which points to one of PUCCH resources that are configured by higher layers.

Depending on DL/UL slot configurations, or whether carrier aggregation, or per code-block group (CBG) transmission used in the DL, the feedback for several PDSCHs may need to be multiplexed in one feedback. This is done by constructing HARQ-ACK codebooks. In NR, the UE may be configured to multiplex the A/N bits using a semi-static codebook or a dynamic codebook.

Figure 4:
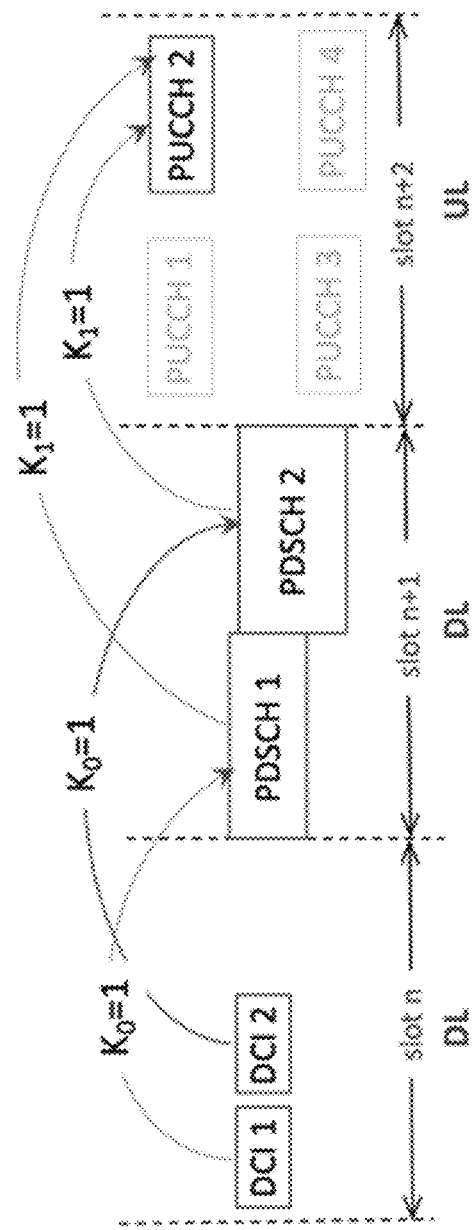
FIG. 4, showing an exemplary feedback signalling scenario.

FIG. 4 shows an exemplary signalling scenario, in particular it illustrates the timelines in a simple scenario with two PDSCHs and one feedback. In this example, there are in total 4 PUCCH resources configured, and the PRI indicates PUCCH 2 to be used for HARQ feedback. In NR Rel-15, a UE can be configured with maximum 4 PUCCH resource sets for transmission of HARQ-ACK information. Each set is associated with a range of UCI payload bits including HARQ-ACK bits. The first set is always associated to 1 or 2 HARQ-ACK bits and hence includes only PUCCH format 0 or 1 or both. The range of payload values (minimum of maximum values) for other sets, if configured, is provided by configuration except the maximum value for the last set where a default value is used, and the minimum value of the second set being 3.

The first set can include maximum 32 PUCCH resources of PUCCH format 0 or 1. Other sets can include maximum 8 bits of format 2 or 3 or 4. The UE determines a slot for transmission of HARQ-ACK bits in a PUCCH corresponding to PDSCHs scheduled or activated by DCI via K1 value provided by configuration or a field in the corresponding DCI. The UE forms a codebook from the HARQ-ACK bits with associated PUCCH in a same slot via corresponding K1 values. The UE determines a PUCCH resource set that the size of the codebook is within the corresponding range of payload values associated to that set. The UE determines a PUCCH resource in that set if the set is configured with maximum 8 PUCCH resources, by a field in the last DCI associated to the corresponding PDSCHs. If the set is the first set and is configured with more than 8 resources, a PUCCH resource in that set is determined by a field in the last DCI associated to the corresponding PDSCHs and implicit rules based on the CCE. A PUCCH resource for HARQ-ACK transmission can overlap in time with other PUCCH resources for CSI and/or SR transmissions as well as PUSCH transmissions in a slot. In case of overlapping PUCCH and/or PUSCH resources, first the UE resolves overlapping between PUCCH resources, if any, by determining a PUCCH resource carrying the total UCI (including HARQ-ACK bits) such that the UCI multiplexing timeline requirements are met. There might be partial or completely dropping of CSI bits, if any, to multiplex the UCI in the determined PUCCH resource. Then, the UE resolves overlapping between PUCCH and PUSCH resources, if any, by multiplexing the UCI on the PUSCH resource if the timeline requirements for UCI multiplexing is met. The feedback signalling provided may be represented by a HARQ codebook, e.g. of a given type, like Type 1, 2 or 3.

A Type 1 or semi-static codebook consists of a bit sequence where each element contains the A/N bit from a possible allocation in a certain slot, carrier, or transport block (TB). When the UE is configured with CBG and/or time-domain resource allocation (TDRA) table with multiple entries, multiple bits are generated per slot and TB (see below). The codebook is derived regardless of the actual PDSCH scheduling. The size and format of the semi-static codebook is preconfigured based on the mentioned parameters. The drawback of semi-static HARQ ACK codebook is that the size is fixed, and regardless of whether there is a transmission or not a bit is reserved in the feedback matrix.

In the case when a UE has a TDRA table with multiple time-domain resource allocation entries configured: The table is pruned (i.e., entries are removed based on a specified algorithm) to derive a TDRA table that only contains non-overlapping time-domain allocations. One bit is then reserved in the HARQ CB for each non-overlapping entry (assuming a UE is capable of supporting reception of multiple PDSCH in a slot).

In a Type 2 or dynamic HARQ codebook, an A/N bit is present in a codebook only if there is a corresponding transmission scheduled. To avoid any confusion between the gNB and the UE, on the number of PDSCHs that the UE has to send a feedback for, a counter downlink assignment indicator (counter DAI or C-DAI) field exists in DL assignment, which denotes accumulative number of (serving cell, PDCCH occasion) pairs in which a PDSCH is scheduled to a UE up to the current PDCCH. In addition to that, there may be another field called total DAI (T-DAI) when carrier aggregation is configured, which when present shows the total number of (serving cell, PDCCH occasion) up to (and including) all PDCCHs across all serving cells of the current PDCCH monitoring occasion. The timing for sending HARQ feedback is determined based on both PDSCH transmission slot with reference to PDCCH slot ($K_0$) and the PUCCH slot that contains HARQ feedback ($K_1$).

In Rel-16, an enhanced dynamic codebook or enhanced Type-2 codebook based on Type 2 codebook is introduced to enable retransmission of the HARQ feedback corresponding to the used HARQ processes. If, for any reason, the scheduled codebook was not received, the retransmission of the feedback can be requested by the gNB. A toggle bit, new feedback indicator (NFI), is added in the DCI to indicate whether the HARQ-ACK feedback from the UE was received by the gNB or not. If toggled, the UE assumes that the reported feedback was correctly received. Otherwise, if the gNB fails to receive the scheduled PUCCH, the UE is expected to retransmit the feedback. In the latter case, the DAI (C/T-DAI) counting is not reset, instead the DAI are accumulated within a PDSCH group until NFI for the PDSCH group is toggled. As the triggering of additional HARQ feedback reporting occurs with ambiguous timing relation to the associated PDSCHs, PDSCH grouping is introduced. PDSCH group is defined as the PDSCH(s) for which the HARQ-ACK information is originally indicated to be carried in a same PUCCH. PDSCH grouping allows the gNB to explicitly indicate which codebook is missing. The group index is explicitly signaled in the scheduling DCI. If enhanced dynamic codebook is configured, two PDSCH groups are supported. Together with the group ID, the gNB signals a request group ID which is a 1-bit field. By referring to the group Id (ID), request ID (RI), and the value of the NFI field in the DCI, the UE can figure out if the next feedback occasion should include only initial transmission or also retransmission of feedback corresponding to PDSCH(s) associated with the indicated group.

A DAI value (Uplink DAI) may also be included in the UL grant scheduling PUSCH. As an additional functionality, the gNB may indicate the DAI value for each group separately in the UL grant to resolve any possible ambiguity at the UE side.

For a One-shot (Type-3) HARQ codebook, the UE can be configured to monitor feedback request of a HARQ-ACK codebook containing all DL HARQ processes. The feedback can be requested in DL DCI format 1_1. In response to the trigger, the UE reports the HARQ-ACK feedback for all DL HARQ processes. The format of the feedback, either CBG-based HARQ-ACK or TB-based HARQ-ACK, can be configured to be part of the one-shot HARQ feedback for the component carriers. Additionally, to resolve any possible ambiguity between the gNB and the UE that might be caused by possible mis-detection of PDCCH(s), the UE can be configured to report the corresponding latest NDI value for a latest received PDSCH for that HARQ process along with the corresponding HARQ-ACK for the received PDSCH. From a gNB perspective, if the NDI value matches the last transmitted value, it indicates that the reported HARQ-ACK feedback correctly corresponds to the HARQ process with pending feedback. Otherwise, the mismatch suggests that the UE is reporting an outdated feedback.

Dynamic (Type-2) HARQ-ACK codebook generation for multi-PDSCH scheduling is discussed. Up to Rel-16, PDSCH can be scheduled using DCI 1_0, 1_1, 2_1, all which schedule one PDSCH at a time. Multi-PDSCH scheduling, one DL DCI (scheduling assignment) scheduling multiple PDSCHs is discussed, as scheduling multiple PDSCHs with a single DCI allows reducing PDCCH overhead and UE PDCCH monitoring, in particular in the context of high carrier frequencies (which allow large data throughput). A scheduling assignment for multi-PDSCH scheduling may be seen as associated to multiple subpatterns of feedback information, wherein each subpattern may pertain to a different scheduled or schedulable PDSCH.

For HARQ feedback/codebook determination, in a first variant, a DAI counting mechanism may be used. More specifically, the DAI values (C-DAI/T-DAI) may denote the accumulative/total numbers of {serving cell, PDCCH monitoring occasion}-pairs in which a valid DL scheduling DCI is detected; C-DAI/T-DAI may be counted per DCI. The number of HARQ-ACK bits corresponding to each DAI of the HARQ-ACK codebook for multi-PDSCH DCI depends on $N_{PDSCH,MAX}$ (if time domain bundling is not used), where $N_{PDSCH,MAX}$ is the configured maximum number of PDSCHs for multi-PDSCH DCI. In case the number of scheduled PDSCHs by a particular DCI is smaller than $N_{PDSCH,MAX}$, the unused HARQ-ACK bits in the codebook can be filled up with padding NACK. As such, the total HARQ-ACK codebook size is determined by $DAI*N_{MAX,PDSCH}$, where DAI may be the counter or total DAI value in the last scheduling DCI (scheduling assignment).

In an alternative (second) variant, the DAI values (C-DAI/T-DAI) may denote the accumulative/total numbers of PDSCHs up to the current PDCCH; C-DAI/T-DAI may be counted per PDSCH. To maintain the same HARQ feedback robustness against PDCCH mis-detection, the bit-width of the DAI value may be extended. This may generate a compact HARQ-ACK codebook in the sense that the number of HARQ-ACK bits may be determined by the actual number of scheduled PDSCHs. No NACK padding bit may be necessary.

For Type-2 HARQ-ACK codebook enhancement for multi-PDSCH scheduling as described in the first variant, the number of HARQ-ACK bits corresponding to each DAI of the HARQ-ACK codebook for multi-PDSCH DCI may depend on $N_{PDSCH,MAX}$ (if time domain bundling is not used), where $N_{PDSCH,MAX}$ is the configured maximum number of PDSCHs for multi-PDSCH DCI. In case the number of actual scheduled PDSCHs is smaller than $N_{PDSCH,MAX}$, the unused HARQ-ACK bits in the codebook nay be filled up with NACK (for padding). NACK used for padding may be generally be considered of different type than ACK or NACK pertaining to scheduled PDSCH/subject transmission. In particular, NACK used for padding (e.g., for schedulable, but not scheduled transmission) may be considered of a first type of subpattern, ACK/NACK pertaining to scheduled PDSCH/subject transmission may be considered of a second type of subpattern.

When Polar coding is used for a Type-2 HARQ-ACK codebook that contains a number of NACK padding bits, the padding bits can be distributed over the entire HARQ-ACK codebook. Some of the padding bits might be mapped to Polar bits with high reliability, which is not efficient usage of reliable Polar channels because the padding bits are already known by the decoder. It is proposed to map the NACK padding bits to the less reliable Polar bits (Polar bits with lower reliability value) to improve the decoding performance at the receiver (gNB). To achieve this, the bit ordering of the Type-2 HARQ-ACK codebook for multi-PDSCH scheduling may be optimized by taking Polar sequence reliability into account. With the increasing reliability of the Polar coding bits, HARQ-ACK bits placed early in the codebook may have lower reliability or protection than those placed later in the codebook. This can result in less reliable HARQ-ACK feedback for PDSCH scheduling in certain slots relative to other slots. To equalize the HARQ-ACK feedback reliability variation amongst slots, HARQ-ACK bit sequence order may be optimized.

Approaches of re-arranging the bit ordering of Type-2 HARQ-ACK codebook for multi-PDSCH scheduling when NACK padding bits are included in the codebook are discussed. Simple binary sequence operation such as reversing and interleaving to push the NACK padding bits to the beginning of the HARQ-ACK codebook as much as possible are considered, as that they can be mapped to the less reliable Polar bits at the subsequent Polar encoding.

Approaches discussed in particular allow optimising Type-2 HARQ-ACK codebook structure, e.g., for multi-PDSCH scheduling in Rel-17. By optimizing the bit ordering of HARQ-ACK codebook, the proposed solution may improve Polar decoding performance and performance, e.g., PUCCH link performance. Approaches suggest bundling NACK padding bits at the beginning of the HARQ-ACK codebook for Type-2 HARQ-ACK codebook enhancement Alt-1 for multi-PDSCH scheduling in Rel-17. However, the approaches may be generalised, e.g., for homogeneous codebook handling, and/or for other types of coding and/or codebooks. Moreover, approaches may be useful for measurement reporting as well, e.g., mapping known information or information or low priority information to the beginning of the polar coding sequence. Variants of determining optimised feedback information bit sequences are described exemplarily. However, different variants, or mathematically equivalent variants (e.g., with different operations leading to the same mapping) may be considered.

In a variant 1, the Type-2 HARQ-ACK codebook for multi-PDSCH scheduling may be constructed by the following procedure. For each multi-PDSCH scheduling (a multi-PDSCH scheduling may in general correspond to one multi-PDSCH scheduling DCI or scheduling assignment), there may be generated $N_{MAX,PDSCH}*N_{MAX,A/N}$ HARQ-ACK bits, e.g., according to the order of the PDSCH transmission, where $N_{MAX,PDSCH}$ may be the maximum number of PDSCHs that can be scheduled by a single DCI and $N_{MAX,A/N}$ may be the maximum number of HARQ-ACK bits generated for one PDSCH. If the actual number of PDSCHs scheduled by the Das is less than $N_{MAX,PDSCH}$ (representing a case of not all schedulable subject transmission being scheduled), padding bits may be appended to generate said $N_{MAX,PDSCH}*N_{MAX,A/N}$ HARQ-ACK bits (padding may be such that bits associated to one DCI are grouped together sequentially).

The sequence of the HARQ-ACK bits for each multi-PDSCH scheduling may be reversed.

The reversed HARQ-ACK bits sequence for all multi-PDSCH scheduling whose HARQ feedback is scheduled to be transmitted on the same UL PUCCH or PUSCH may be concatenated.

The concatenated HARQ-ACK bits generated in the previous action may be interleaved. The interleaving size may be or correspond to or be indicated by the counter DAI value in the last multi-PDSCH scheduling DCI. Interleaving may be based on a rectangular interleaver with the row size determined by the counter DAI value in the last (received) multi-PDSCH scheduling DCI and the column size determined by $N_{MAX,PDSCH}$ and $N_{MAX,A/N}$. The bits may be written in row-wise and read out column-wise.

For example, assuming HARQ feedback for PDSCHs scheduled by 4 multi-PSDCH scheduling assignments are to be transmitted on the same PUCCH 8 or PUSCH). $N_{MAX,PDSCH}$ may be 8 and $N_{MAX,A/N}$ may be 1. The actual number of PDSCHs scheduled by the Das may be 6, hence 6 HARQ-ACK bits and 2 padding bits (NACK) are generated for each multi-PDSCH scheduling. It may be considered denoting the HARQ-ACK bit as $H_{i,j}$ and Padding bits as $P_{i,k}$, where i is the scheduling index, j and k are the HARQ-ACK bit and the padding bit indices for a multi-PDSCH scheduling, respectively.

The following HARQ-ACK bits are generated for the 4 multi-PDSCH scheduling where the padding bits are appended to each multi-PDSCH scheduling (which may be considered representing a base sequence, or 4 base sequences which may be concatenated):

$H_{1,1}, H_{1,2}, H_{1,3}, H_{1,4}, H_{1,5}, H_{1,6}, P_{1,1}, P_{1,2}$
$H_{2,1}, H_{2,2}, H_{2,3}, H_{2,4}, H_{2,5}, H_{2,6}, P_{2,1}, P_{2,2}$
$H_{3,1}, H_{3,2}, H_{3,3}, H_{3,4}, H_{3,5}, H_{3,6}, P_{3,1}, P_{3,2}$
$H_{4,1}, H_{4,2}, H_{4,3}, H_{4,4}, H_{4,5}, H_{4,6}, P_{4,1}, P_{4,2}$

Reverse the bit sequences of the HARQ-ACK bits for each multi-PDSCH scheduling:

$P_{1,2}, P_{1,1}, H_{1,6}, H_{1,5}, H_{1,4}, H_{1,3}, H_{1,2}, H_{1,1}$
$P_{2,2}, P_{2,1}, H_{2,6}, H_{2,5}, H_{2,4}, H_{2,3}, H_{2,2}, H_{2,1}$
$P_{3,2}, P_{3,1}, H_{3,6}, H_{3,5}, H_{3,4}, H_{3,3}, H_{3,2}, H_{3,1}$
$P_{4,2}, P_{4,1}, H_{4,6}, H_{4,5}, H_{4,4}, H_{4,3}, H_{4,2}, H_{4,1}$

Concatenate the reversed HARQ-ACK bits sequence for all multi-PDSCH scheduling:

$P_{1,2}, P_{1,1}, H_{1,6}, H_{1,5}, H_{1,4}, H_{1,3}, H_{1,2}, H_{1,1}, P_{2,2}, P_{2,1}, H_{2,6}, H_{2,5}, H_{2,4}, H_{2,3}, H_{2,2}, H_{2,1}, P_{3,2}, P_{3,1}, H_{3,6}, H_{3,5}, H_{3,4}, H_{3,3}, H_{3,2}, H_{3,1}, P_{4,2}, P_{4,1}, H_{4,6}, H_{4,5}, H_{4,4}, H_{4,3}, H_{4,2}, H_{4,1}$

Interleave the concatenated HARQ-ACK bits to arrive at a sequence of feedback information bits:

$P_{1,2}, P_{2,2}, P_{3,2}, P_{4,2}, P_{1,1}, P_{2,1}, P_{3,1}, P_{4,1}, H_{1,6}, H_{2,6}, H_{3,6}, H_{4,6}, H_{1,5}, H_{2,5}, H_{3,5}, H_{4,5}, H_{1,4}, H_{2,4}, H_{3,4}, H_{4,4}, H_{1,3}, H_{2,3}, H_{3,3}, H_{4,3}, H_{1,2}, H_{2,2}, H_{3,2}, H_{4,2}, H_{1,1}, H_{2,1}, H_{3,1}, H_{4,1}$

It may be seen that subpatterns P of a first type (padding) are arranged together, before the subpatterns H of a second type (ACK/NACK for scheduled subject transmission, namely PDSCH)

With these manipulations, the padding bits can be placed as the beginning of the HARQ-ACK codebook and mapped to the less reliable Polar bits in the subsequent Polar encoding processing. Furthermore, the HARQ-ACK bits of each multi-PDSCH scheduling are distributed uniformly in the sequence and thus the HARQ-ACK bits from different multi-PDSCH scheduling will receive identical Polar protection reliability.

In a variant 2, the Type-2 HARQ-ACK codebook for multi-PDSCH scheduling may be constructed by the following procedure:

For each multi-PDSCH scheduling, $N_{MAX,PDSCH}*N_{MAX,A/N}$ HARQ-ACK bits may be generated, e.g., according to the order of the PDSCH transmission, where $N_{MAX,PDSCH}$ may be the maximum number of PDSCHs that can be scheduled by a single DCI and $N_{MAX,A/N}$ may be the maximum number of HARQ-ACK bits generated for one PDSCH. If the actual number of PDSCHs scheduled by the Das is less than $N_{MAX,PDSCH}$, padding bits are appended to generate said $N_{MAX,PDSCH}*N_{MAX,A/N}$ HARQ-ACK bits, e.g. as discussed above.

The HARQ-ACK bits sequence for all multi-PDSCH scheduling whose HARQ feedback is scheduled to be transmitted on the same UL PUCCH or PUSCH may be concatenated.

The concatenated HARQ-ACK bits generated in the previous action may be interleaved. The interleaving size may be or correspond to the counter DAI value in the last (received) multi-PDSCH scheduling DCI. Interleaving may be based on a rectangular interleaver with the row size determined by the counter DAI value in the last multi-PDSCH scheduling DCI and the column size determined by $N_{MAX,PDSCH}$ and $N_{MAX,A/N}$. The bits may be written in row-wise and read out column-wise.

The sequence of the interleaved HARQ-ACK bits generated in the previous action may be reversed. It is noted that for this variant, actions 3 and 4 can be swapped and the same bit sequence can be generated (interleaving and reversing).

For example, HARQ feedback for PDSCHs scheduled by 4 multi-PSDCH schedulings may be assumed to be transmitted on the same PUCCH or PUSCH. $N_{MAX,PDSCH}$ may be 8 and $N_{MAX,A/N}$ may be 1. The actual number of PDSCHs scheduled by the $1^{st}, 2^{nd}, 3^{rd}$, and $4^{th}$ Das may be 6, 4, 5, and 3, respectively. Hence 6, 4, 5, and 3 HARQ-ACK bits and 2, 4, 3, and 5 padding bits (NACK) are generated for the 4 multi-PDSCH schedulings, respectively. It may be considered denote a HARQ-ACK bit as $H_{i,j}$ and Padding bits as $P_{i,k}$, where i is the scheduling index, j and k are the HARQ-ACK bit and the padding bit indices for a multi-PDSCH scheduling respectively.

The following HARQ-ACK bits are generated for the 4 multi-PDSCH scheduling where the padding bits are appended to each multi-PDSCH scheduling:

$H_{1,1}, H_{1,2}, H_{1,3}, H_{1,4}, H_{1,5}, H_{1,6}, P_{1,1}, P_{1,2}$
$H_{2,1}, H_{2,2}, H_{2,3}, H_{2,4}, H_{2,5}, H_{2,6}, P_{2,1}, P_{2,2}$
$H_{3,1}, H_{3,2}, H_{3,3}, H_{3,4}, H_{3,5}, H_{3,6}, P_{3,1}, P_{3,2}$
$H_{4,1}, H_{4,2}, H_{4,3}, H_{4,4}, H_{4,5}, H_{4,6}, P_{4,1}, P_{4,2}$

Concatenate the HARQ-ACK bits sequence for all multi-PDSCH scheduling:

$H_{1,1}, H_{1,2}, H_{1,3}, H_{1,4}, H_{1,5}, H_{1,6}, P_{1,1}, P_{1,2}, H_{2,1}, H_{2,2}, H_{2,3}, H_{2,4}, H_{2,5}, H_{2,6}, P_{2,1}, P_{2,2}, H_{3,1}, H_{3,2}, H_{3,3}, H_{3,4}, H_{3,5}, H_{3,6}, P_{3,1}, P_{3,2}, H_{4,1}, H_{4,2}, H_{4,3}, H_{4,4}, H_{4,5}, H_{4,6}, P_{4,1}, P_{4,2}$

Interleave the concatenated HARQ-ACK bits:

$H_{1,1}, H_{2,1}, H_{3,1}, H_{4,1}, H_{1,2}, H_{2,2}, H_{3,2}, H_{4,2}, H_{1,3}, H_{2,3}, H_{3,3}, H_{4,3}, H_{1,4}, H_{2,4}, H_{3,4}, H_{4,4}, H_{1,5}, H_{2,5}, H_{3,5}, H_{4,5}, H_{1,6}, H_{2,6}, H_{3,6}, H_{4,6}, P_{1,1}, P_{2,1}, P_{3,1}, P_{4,1}, P_{1,2}, P_{2,2}, P_{3,2}, P_{4,2}$

Reverse the bit sequences of the interleaved HARQ-ACK bits to arrive at a sequence of feedback information bits:

$P_{4,2}, P_{3,2}, P_{2,2}, P_{1,2}, P_{4,1}, P_{3,1}, P_{2,1}, P_{1,1}, H_{4,6}, H_{3,6}, H_{2,6}, H_{1,6}, H_{4,5}, H_{3,5}, H_{2,5}, H_{1,5}, H_{4,4}, H_{3,4}, H_{2,4}, H_{1,4}, H_{4,3}, H_{3,3}, H_{2,3}, H_{1,3}, H_{4,2}, H_{3,2}, H_{2,2}, H_{1,2}, H_{4,1}, H_{3,1}, H_{2,1}, H_{1,1}$

With these manipulations, the padding bits can also be placed as the beginning of the HARQ-ACK codebook and mapped to the less reliable Polar bits in the subsequent Polar encoding processing. Furthermore, the HARQ-ACK bits of each multi-PDSCH scheduling are distributed uniformly in the sequence and thus the HARQ-ACK bits from different multi-PDSCH scheduling will receive identical Polar protection reliability.

In a variant 3, the Type-2 HARQ-ACK codebook for multi-PDSCH scheduling may be constructed by the following procedure: For each multi-PDSCH scheduling, $N_{MAX,PDSCH} N_{MAX,A/N}$ HARQ-ACK bits may be generated, e.g., according to order of the PDSCH transmission, where $N_{MAX,PDSCH}$ may be the maximum number of PDSCHs that can be scheduled by a single DCI and $N_{MAX,A/N}$ may be the maximum number of HARQ-ACK bits generated for one PDSCH. If the actual number of PDSCHs scheduled by the Das is less than $N_{MAX,PDSCH}$, padding bits may be prepended to generate said $N_{MAX,PDSCH}*N_{MAX,A/N}$ HARQ-ACK bits.

The HARQ-ACK bits sequence for all multi-PDSCH scheduling whose HARQ feedback is scheduled to be transmitted on the same UL PUCCH or PUSCH may be generated.

The concatenated HARQ-ACK bits generated in the previous action may be interleaved. The interleaving size may be or correspond to the counter DAI value in the last (received) multi-PDSCH scheduling DCI. The interleaving may be based on a rectangular interleaver with the row size determined by the counter DAI value in the last (received) multi-PDSCH scheduling DCI and the column size determined by $N_{MAX,PDSCH}$ and $N_{MAX,A/N}$. The bits may be written in row-wise and read out column-wise.

For example, assuming HARQ feedback for PDSCHs scheduled by 4 multi-PSDCH scheduling assignments is to be transmitted on the same PUCCH or PUSCH. $N_{MAX,PDSCH}$ may be 8 and $N_{MAX,A/N}$ $^{may\ be}$ 1. The actual number of PDSCHs scheduled by the Das may be 6, hence 6 HARQ-ACK bits and 2 padding bits (NACK) are generated for each multi-PDSCH scheduling. It may be considered denoting the HARQ-ACK bit as $H_{i,j}$ and Padding bits as $P_{i,k}$, where i is the scheduling index, j and k are the HARQ-ACK bit and the padding bit indices for a multi-PDSCH scheduling respectively.

The following HARQ-ACK bits are generated for the 4 multi-PDSCH scheduling where the padding bits are prepended to each multi-PDSCH scheduling:

$P_{1,1}, P_{1,2}, H_{1,1}, H_{1,2}, H_{1,3}, H_{1,4}, H_{1,5}, H_{1,6}$
$P_{2,1}, P_{2,2}, H_{2,1}, H_{2,2}, H_{2,3}, H_{2,4}, H_{2,5}, H_{2,6}$
$P_{3,1}, P_{3,2}, H_{3,1}, H_{3,2}, H_{3,3}, H_{3,4}, H_{3,5}, H_{3,6}$
$P_{4,1}, P_{4,2}, H_{4,1}, H_{4,2}, H_{4,3}, H_{4,4}, H_{4,5}, H_{4,6}$

Concatenate the HARQ-ACK bits sequence for all multi-PDSCH scheduling:

$P_{1,1}, P_{1,2}, H_{1,1}, H_{1,2}, H_{1,3}, H_{1,4}, H_{1,5}, H_{1,6}, P_{2,1}, P_{2,2}, H_{2,1},$
$H_{2,2}, H_{2,3}, H_{2,4}, H_{2,5}, H_{2,6}, P_{3,1}, P_{3,2}, H_{3,1}, H_{3,2}, H_{3,3},$
$H_{3,4}, H_{3,5}, H_{3,6}, P_{4,1}, P_{4,2}, H_{4,1}, H_{4,2}, H_{4,3}, H_{4,4}, H_{4,5},$
$H_{4,6}$

Interleave the concatenated HARQ-ACK bits to arrive at a sequence of feedback information bits:

$P_{1,1}, P_{2,1}, P_{3,1}, P_{4,1}, P_{1,2}, P_{2,2}, P_{3,2}, P_{4,2}, H_{1,1}, H_{2,1}, H_{3,1},$
$H_{4,1}, H_{1,2}, H_{2,2}, H_{3,2}, H_{4,2}, H_{1,3}, H_{2,3}, H_{3,3}, H_{4,3}, H_{1,4},$
$H_{2,4}, H_{3,4}, H_{4,4}, H_{1,5}, H_{2,5}, H_{3,5}, H_{4,5}, H_{1,6}, H_{2,6}, H_{3,6},$
$H_{4,6}$

With these manipulations, the padding bits can be placed as the beginning of the HARQ-ACK codebook and mapped to the less reliable Polar bits in the subsequent Polar encoding processing. Furthermore, the HARQ-ACK bits of each multi-PDSCH scheduling are distributed uniformly in the sequence and thus the HARQ-ACK bits from different multi-PDSCH scheduling will receive identical Polar protection reliability.

In a variation 4 (e.g., of any of variant #1 or #3), the HARQ-ACK sequences for each multi-PDSCH scheduling may be re-ordered prior to concatenation and interleaving in order of decreasing number of padding bits. If two or more multi-PDSCH schedulings have the same number of padding bits, the relative order may or may not be changed amongst those schedulings to avoid ambiguity at the decoder. With this reordering, the padding bits occur as close as possible to the beginning of the interleaved sequence.

The same approach can be applied to Variant #2, except the re-ordering may be performed in order of increasing number of padding bits.

For example, assuming HARQ feedback for PDSCHs scheduled by 4 multi-PSDCH scheduling assignments is to be transmitted on the same PUCCH or PUSCH. $N_{MAX,PDSCH}$ may be 8 and $N_{MAX,A/N}$ may be 1. The actual number of PDSCHs scheduled by the 1st, 2nd, 3rd, and 4th Das may be 6, 4, 5, and 3, respectively. Hence 6, 4, 5, and 3 HARQ-ACK bits and 2, 4, 3, and 5 padding bits (NACK) are generated for the 4 multi-PDSCH scheduling assignments, respectively. It may be considered denoting the HARQ-ACK bit as $H_{i,j}$ and Padding bits as $P_{i,k}$, where i is the scheduling index, j and k are the HARQ-ACK bit and the padding bit indices for a multi-PDSCH scheduling respectively.

The following HARQ-ACK bits are generated for the 4 multi-PDSCH scheduling where the padding bits are prepended to each multi-PDSCH scheduling:

$P_{1,1}, P_{1,2}, H_{1,1}, H_{1,2}, H_{1,3}, H_{1,4}, H_{1,5}, H_{1,6}$ (2 padding bits)
$P_{2,1}, P_{2,2}, P_{2,3}, P_{2,4}, H_{2,1}, H_{2,2}, H_{2,3}, H_{2,4}$ (4 padding bits)
$P_{3,1}, P_{3,2}, P_{3,3}, H_{3,1}, H_{3,2}, H_{3,3}, H_{3,4}, H_{3,5}$ (3 padding bits)
$P_{4,1}, P_{4,2}, P_{4,3}, P_{4,4}, P_{4,5}, H_{4,1}, H_{4,2}, H_{4,3}$ (5 padding bits)

Reorder the HARQ-ACK bit sequences according to decreasing number of padding bits $P_{4,1}, P_{4,2}, P_{4,3}, P_{4,4}, P_{4,5}, H_{4,1}, H_{4,2}, H_{4,3}$ (5 padding bits)
$P_{2,1}, P_{2,2}, P_{2,3}, P_{2,4}, H_{2,1}, H_{2,2}, H_{2,3}, H_{2,4}$ (4 padding bits)
$P_{3,1}, P_{3,2}, P_{3,3}, H_{3,1}, H_{3,2}, H_{3,3}, H_{3,4}, H_{3,5}$ (3 padding bits)
$P_{1,1}, P_{1,2}, H_{1,1}, H_{1,2}, H_{1,3}, H_{1,4}, H_{1,5}, H_{1,6}$ (2 padding bits)

Concatenate the re-ordered HARQ-ACK bits sequences for all multi-PDSCH scheduling assignments $P_{4,1}, P_{4,2}, P_{4,3}, P_{4,4}, P_{4,5}, H_{4,1}, H_{4,2}, H_{4,3}, P_{2,1}, P_{2,2}, P_{2,3},$
$P_{2,4}, H_{2,1}, H_{2,2}, H_{2,3}, H_{2,4}, P_{3,1}, P_{3,2}, P_{3,3}, P_{2,4}, H_{2,1},$
$H_{2,2}, H_{2,3}, H_{2,4}, P_{1,1}, P_{1,2}, H_{1,1}, H_{1,2}, H_{1,3}, H_{1,4}, H_{1,5},$
$H_{1,6}$ Interleave the concatenated HARQ-ACK bits to arrive at the sequence of feedback information bits:

$P_{4,1}, P_{2,1}, P_{3,1}, P_{1,1}, P_{4,2}, P_{2,2}, P_{3,2}, P_{1,2}, P_{4,3}, P_{2,3}, P_{3,3},$
$H_{1,1}, P_{4,4}, P_{2,4}, H_{3,1}, H_{1,2}, P_{4,5}, H_{2,1}, H_{3,2}, H_{1,3}, H_{4,1},$
$H_{2,2}, H_{3,3}, H_{1,4}, H_{4,2}, H_{2,3}, H_{3,4}, H_{1,5}, H_{4,3}, H_{2,4}, H_{3,5},$
$H_{1,6}$

With these manipulations, the padding bits are placed as close to the beginning of the HARQ-ACK codebook as possible and mapped to the less reliable Polar bits in the subsequent Polar encoding processing. Furthermore, the HARQ-ACK bits of each multi-PDSCH scheduling are distributed uniformly in the sequence and thus the HARQ-ACK bits from different multi-PDSCH scheduling will receive identical Polar protection reliability.

According to variant 5, the mapping of NACK padding bits in a Type-2 HARQ-ACK codebook may follow a strict increasing order of reliability rather than a sequential mapping using the existing reliability ordering. In a non-limiting exemplary implementation of this variant, the Type-2 HARQ-ACK codebook for multi-PDSCH scheduling may be constructed by the following procedure:

For each multi-PDSCH scheduling, $N_{MAX,PDSCH}*N_{MAX,A/N}$ HARQ-ACK bits are generated, e.g., according to the order of the PDSCH transmission, where $N_{MAX,PDSCH}$ may be the maximum number of PDSCHs that can be scheduled by a single DCI and $N_{MAX,A/N}$ may be the maximum number of HARQ-ACK bits generated for one PDSCH. If the actual number of PDSCHs scheduled by the Das is less than $N_{MAX,PDSCH}$, padding bits are appended or prepended to generate said $N_{MAX,PDSCH}*N_{MAX,A/N}$ HARQ-ACK bits.

The HARQ-ACK bits sequence for all multi-PDSCH scheduling assignments whose HARQ feedback is scheduled to be transmitted on the same UL PUCCH or PUSCH may be concatenated.

A CRC checksum may be generated and appended to the HARQ-ACK codebook. According to variants an approaches described herein, in the UCI Polar encoding process, the NACK padding bits may be mapped to the least reliable Polar bits amongst the set of K non-frozen bits, and the non-padding HARQ-ACK bits and CRC bits are mapped to the remaining non-frozen bits sequentially.

Figure 5:
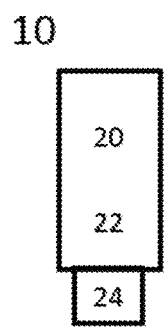
FIG. 5, showing an exemplary (e.g., feedback) radio node.

FIG. 5 schematically shows a radio node, in particular a wireless device or terminal 10 or a UE (User Equipment). Radio node 10 comprises processing circuitry (which may also be referred to as control circuitry) 20, which may comprise a controller connected to a memory. Any module of the radio node 10, e.g., a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g., a RAN as described herein, and/or for sidelink communication (which may be within coverage of the cellular network, or out of coverage; and/or may be considered non-cellular communication and/or be associated to a non-cellular wireless communication network). Radio node 10 may generally be adapted to carry out any of the methods of operating a radio node like terminal or UE disclosed herein; in particular, it may comprise corresponding circuitry, e.g., processing circuitry, and/or modules, e.g., software modules. It may be considered that the radio node 10 comprises, and/or is connected or connectable, to a power supply.

Figure 6:
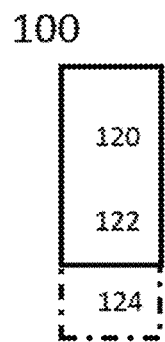
FIG. 6, showing another exemplary (e.g., signalling) radio node.

FIG. 6 schematically shows a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g., transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g., processing circuitry, and/or modules. The antenna circuitry 124 may be connected to and/or comprise an antenna array.

The node 100, respectively its circuitry, may be adapted to perform any of the methods of operating a network node or a radio node as described herein; in particular, it may comprise corresponding circuitry, e.g., processing circuitry, and/or modules. The radio node 100 may generally comprise communication circuitry, e.g., for communication with another network node, like a radio node, and/or with a core network and/or an internet or local net, in particular with an information system, which may provide information and/or data to be transmitted to a user equipment.

Aspects regarding QCL may be considered. For example, several signals may be transmitted from different antenna ports and/or transmission sources associated to the same base station at a same or different time. If these signals have the same large-scale properties such as Doppler shift/spread, average delay spread, or average delay, these antenna ports are said to be quasi co-located (QCL) with respect to the large-scale properties. If a UE knows that two antenna ports are QCL with respect to a certain parameter (e.g., Doppler spread), the UE can estimate that parameter based on a first antenna port and apply that estimate for receiving signal on the second antenna port. Typically, a measurement reference signal (RS) such as NZP CSI-RS (Non-Zero Power Channel State Information Reference Signal) or SSB (Synchronization Signal Block), known as source RS, is sent on the first antenna and another signal such as a demodulation reference signal (DMRS), known as target RS, is sent on the second antenna port. For instance, if antenna ports A and B are QCL with respect to average delay, the UE can estimate the average delay from the signal received from antenna port A and assume that the signal received from antenna port B has the same average delay. This is useful for demodulation because in some scenarios, certain channel properties cannot be reliably estimated based on signals (e.g., DMRS) received on port B. With the QCL relation, the UE can first measure certain channel properties on antenna port A and apply an appropriate channel estimation filter when receiving signals on antenna port B. Information about what assumptions can be made regarding QCL is signaled to the UE from the network. In NR, four types of QCL relations between a transmitted source RS and transmitted target RS were defined:

Type A: {Doppler shift, Doppler spread, average delay, delay spread}
Type B: {Doppler shift, Doppler spread}
Type C: {average delay, Doppler shift}
Type D: {Spatial Rx parameter}
QCL type D is known as spatial QCL. There is currently no strict definition of spatial QCL, but the understanding is that if two transmitted antenna ports are spatially QCL, the UE can use the same Rx beam to receive them.

TCI states may be considered. A QCL relation between two RS may be signaled or indicated to a UE or wireless device through so called TCI (Transmission Configuration Indicator) states. Each TCI state can contain one or two source RS and associated QCL type. For example, a TCI state may contain a pair of source RS and QCL types, e.g., {NZP CSI-RS1, QCL Type A} and {NZP CSI-RS2, QCL Type D}. In this example, the UE can derive Doppler shift, Doppler spread, average delay, delay spread from NZP CSI-RS1 and Spatial Rx parameter (i.e. the RX beam to use) from NZP CSI-RS2. A TCI state can be interpreted as a possible beam transmitted from the network and/or a possible TRP (Transmission Point) used by the network to communicate with the UE. A UE may be configurable through RRC signalling, e.g., with up to 8 TCI states in FR1 and 128 TCI states in FR2 for PDSCH, depending on UE capability. Up to 8 TCI states per BWP (Bandwidth Part) per serving cell may be activated by MAC (Medium Access Control) CE (Control Element). The UE determines QCL for a PDSCH reception based on the TCI-State(s) indicated in the 'Transmission Configuration Indication' field in a DCI scheduling the PDSCH. A mapping between a TCI codepoint in DCI and one or two TCI states may be provided in the enhanced PDSCH MAC CE that activates the TCI states.

In some variants, a search space set may be defined over a CORESET. A CORESET may consist of $N_{RB}^{CORESET}$ resource blocks in the frequency domain and $N_{symb}^{CORESET} \in \{1,2,3\}$ consecutive OFDM symbols in the time domain. For each DL BWP configured to a UE in a serving cell, a UE may be provided by higher layer signalling with P≤5 CORESETs. For each CORESET, a UE may be configured by RRC (Radio Resource Control) signalling with CORESET information element (IE), which may include one or more of:

ControlResourceSetId: a CORESET index P, 0≤p<16;
a DM-RS scrambling sequence initialization value;
a list of up to 64 TCI-States can be configured in a CORESET p;
an indication for a presence or absence of a transmission configuration indication (TCI) field for DCI format 1_1 transmitted by a PDCCH in CORESET p. The corresponding field for indicating a presence or absence of a TCI field for DCI format 1_2 is given by 'tci-PresentInDCI-ForDCIFormat1_2'.

In general, for each CORESET or control region, one TCI state may be activated and/or associated, e.g., by a MAC CE transmitted by a network node.

Single-DCI based DL data transmission over Multiple Transmission Points (TRP) may be considered. A PDSCH, which in general may correspond to data signalling, and/or a data block (in particular, a transport block or code block bundle) may be transmitted to a UE from multiple TRPs. Since different TRPs may be located in different physical locations and/or have different beams, the propagation channels can be different. To facilitate receiving PDSCH data from different TRPs or beams, a UE may be indicated with two TCI states, each associated with a TRP or a beam, by a single codepoint of a TCI field in a DCI. The network may configure the UE with multiple TCI states via RRC. Whether a codepoint in the TCI field is mapped to one or two TCI states may be provided by an enhanced PDSCH MAC CE that activates the TCI states.

As one example of PDSCH transmission over two TRPs, a case may be considered in which different layers of a PDSCH are sent over two TRPs, each associated with a different TCI state. In this case, two DMRS ports, one for each layer, in two CDM (Code Division Multiplex, shifted by different codes) groups may also be signaled to the UE. A first TCI state is associated with the DMRS port in a first CDM group, and a second TCI state is associated with the DMRS port in a second CDM group. This approach may be referred to as NC-JT (Non-coherent joint transmission) or scheme In this context, a single CW (codeword, e.g., associated to one data block) may be transmitted over two TRPs.

Transmitting PDSCH over multiple TRPs can also be used to improve PDSCH transmission reliability. For example, a PDSCH may be sent over TRP1 in PRGs (precoding RB group) {0,2,4} and over TRP2 in PRGs {1,3,5}. The PDSCH is scheduled by a PDCCH or DCI which may be sent over TRP1, i.e. associated with TCI state 1. In another variant, PDSCH Occasion #1 may be transmitted in PRGs {0,2,4} from TRP1 and PDSCH Occasion #2 with the same TB may be transmitted in PRGs {1,3,5} from TRP2. The two PDSCH Occasions may carry the same encoded data payload, and may have the same, or different redundancy version; the UE or wireless device may perform soft combining of the two PDSCHs to achieve more reliable reception.

In some cases, data transmission with PDSCH repetition may be utilised, e.g., such that repetition of one PDSCH (e.g., codeword and/or data block) may occurs within a slot, with different transmission sources or TRP (e.g., with different QCL or TCI) transmitting different occasions of the repetitions. For example, each transmission may be in a mini slot of 4 OFDM symbols within a slot; transmission in different mini-slots may be provided by different transmission sources or TRPs. Each PDSCH transmission may be associated with a same or different RV. For these schemes, a single DCI transmitted from one TRP may be used to schedule multiple PDSCH transmissions over two TRPs.

Alternatively, Multi-DCI based PDSCH transmission with multiple TRPs may be considered. Multi-DCI scheduling for multi-TRP may refer to cases in which a UE or WD may receive two or more DCIs, each DCI scheduling a PDSCH. Each PDCCH and the corresponding (scheduled) PDSCH may be transmitted from the same TRP. For example, a PDSCH1 may be scheduled by PDCCH 1 from TRP1, and PDSCH2 may be scheduled by PDCCH 2 from TRP2. The two PDSCHs may be fully, partially, or non-overlapping in time and/or frequency. When the two PDSCHs are fully or partially overlapping, a same DMRS resource configuration may be assumed with DMRS ports of the two PDSCHs in different CDM groups and/or shifted relative to each other according to another approach. For multi-DCI operation, a UE may be configured with two CORESET pools, each associated with a TRP. Each CORESET pool may correspond to a collection of CORESETs that belongs to the same pool. A CORESET pool index can be configured in each CORESET, e.g., with a value of 0 or 1. For the two Das in the above example, they may be transmitted in two CORESETs belonging to different CORESET pools (i.e. with CORESETPoolIndex 0 and 1 respectively). The two PDSCHs may be associated to, and/or belong to, two different HARQ processes. For multi-DCI based PDSCH scheduling, TCI state activation and mapping to codepoints of the TCI field in DCI may be per CORESET pool; only a single TCI state may be mapped to a codepoint of TCI field in DCI. This means that a DCI sent in a CORESET pool can only schedule a PDSCH from one TRP.

In general, a block symbol and/or an allocation unit may represent and/or correspond to an extension in time domain, e.g., a time interval. A block symbol duration (the length of the time interval) may correspond to the duration of an OFDM symbol or a corresponding duration, and/or may be based and/or defined by a subcarrier spacing used (e.g., based on the numerology) or equivalent, and/or may correspond to the duration of a modulation symbol (e.g., for OFDM or similar frequency domain multiplexed types of signalling). It may be considered that a block symbol comprises a plurality of modulation symbols, e.g., based on a subcarrier spacing and/or numerology or equivalent, in particular for time domain multiplexed types (on the symbol level for a single transmitter) of signalling like single-carrier based signalling, e.g., SC-FDE or SC-FDMA (in particular, FDF-SC-FDMA or pulse-shaped SC-FDMA). The number of symbols may be based on and/or defined by the number of subcarrier to be DFTS-spread (for SC-FDMA) and/or be based on a number of FFT samples, e.g., for spreading and/or mapping, and/or equivalent, and/or may be predefined and/or configured or configurable. A block symbol in this context may comprise and/or contain a plurality of individual modulation symbols, which may be for example 1000 or more, or 3000 or more, or 3300 or more. The number of modulation symbols in a block symbol may be based and/or be dependent on a bandwidth scheduled for transmission of signalling in the block symbol. A block symbol and/or a number of block symbols (an integer smaller than 20, e.g., equal to or smaller than 14 or 7 or 4 or 2 or a flexible number) may be a unit (e.g., allocation unit) used or usable or intended e.g., for scheduling and/or allocation of resources, in particular in time domain. To a block symbol (e.g., scheduled or allocated) and/or block symbol group and/or allocation unit, there may be associated a frequency range and/or frequency domain allocation and/or bandwidth allocated for transmission.

An allocation unit, and/or a block symbol, may be associated to a specific (e.g., physical) channel and/or specific type of signalling, for example reference signalling. In some cases, there may be a block symbol associated to a channel that also is associated to a form of reference signalling and/or pilot signalling and/or tracking signalling associated to the channel, for example for timing purposes and/or decoding purposes (such signalling may comprise a low number of modulation symbols and/or resource elements of a block symbol, e.g., less than 10% or less than 5% or less than 1% of the modulation symbols and/or resource elements in a block symbol). To a block symbol, there may be associated resource elements; a resource element may be represented in time/frequency domain, e.g., by the smallest frequency unit carrying or mapped to (e.g., a subcarrier) in frequency domain and the duration of a modulation symbol in time domain. A block symbol may comprise, and/or to a block symbol may be associated, a structure allowing and/or comprising a number of modulation symbols, and/or association to one or more channels (and/or the structure may dependent on the channel the block symbol is associated to and/or is allocated or used for), and/or reference signalling (e.g., as discussed above), and/or one or more guard periods and/or transient periods, and/or one or more affixes (e.g., a prefix and/or suffix and/or one or more infixes (entered inside the block symbol)), in particular a cyclic prefix and/or suffix and/or infix. A cyclic affix may represent a repetition of signalling and/or modulation symbol/s used in the block symbol, with possible slight amendments to the signalling structure of the affix to provide a smooth and/or continuous and/or differentiable connection between affix signalling and signalling of modulation symbols associated to the content of the block symbol (e.g., channel and/or reference signalling structure). In some cases, in particular some OFDM-based waveforms, an affix may be included into a modulation symbol. In other cases, e.g., some single carrier-based waveforms, an affix may be represented by a sequence of modulation symbols within the block symbol. It may be considered that in some cases a block symbol is defined and/or used in the context of the associated structure.

In some variants, a reference beam and/or reference beams and/or reference signalling may correspond to and/or carry random access signalling, e.g., a random access preamble. Such a reference beam or signalling may be transmitted by another radio node. The signalling may indicate which beam is used for transmitting. Alternatively, the reference beams may be beams receiving the random access signalling. Random access signalling may be used for initial connection to the radio node and/or a cell provided by the radio node, and/or for reconnection. Utilising random access signalling facilitates quick and early beam selection. The random access signalling may be on a random access channel, e.g., based on broadcast information provided by the radio node (the radio node performing the beam selection), e.g., with synchronisation signalling (e.g., SSB block and/or associated thereto). The reference signalling may correspond to synchronisation signalling, e.g., transmitted by the radio node in a plurality of beams. The characteristics may be reported on by a node receiving the synchronisation signalling, e.g., in a random access process, e.g., a msg3 for contention resolution, which may be transmitted on a physical uplink shared channel based on a resource allocation provided by the radio node.

Data signalling may be on a data channel, for example on a PDSCH or PSSCH, or on a dedicated data channel, e.g., for low latency and/or high reliability, e.g., a URLLC channel. Control signalling may be on a control channel, for example on a common control channel or a PDCCH or PSCCH, and/or comprise one or more DCI messages or SCI messages. Reference signalling may be associated to control signalling and/or data signalling, e.g., DM-RS and/or PT-RS.

Reference signalling, for example, may comprise DM-RS and/or pilot signalling and/or discovery signalling and/or synchronisation signalling and/or sounding signalling and/or phase tracking reference signalling and/or cell-specific reference signalling and/or user-specific signalling, in particular CSI-RS. Reference signalling or signalling in general may be signalling with one or more signalling characteristics, in particular transmission power and/or sequence of modulation symbols and/or resource distribution and/or phase distribution known to the receiver. Thus, the receiver can use the reference signalling as a reference and/or for training and/or for compensation. The receiver can be informed about the reference signalling by the transmitter, e.g., being configured and/or signalling with control signalling, in particular physical layer signalling and/or higher layer signalling (e.g., DCI and/or RRC signalling), and/or may determine the corresponding information itself, e.g., a network node configuring a UE to transmit reference signalling. Reference signalling may be signalling comprising one or more reference symbols and/or structures. Reference signalling may be adapted for gauging and/or estimating and/or representing transmission conditions, e.g., channel conditions and/or transmission path conditions and/or channel (or signal or transmission) quality. It may be considered that the transmission characteristics (e.g., signal strength and/or form and/or modulation and/or timing) of reference signalling are available for both transmitter and receiver of the signalling (e.g., due to being predefined and/or configured or configurable and/or being communicated). Different types of reference signalling may be considered, e.g., pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g., power-related or energy-related or amplitude-related (e.g., SRS or pilot signalling) and/or phase-related, etc.

References to specific resource structures like an allocation unit and/or block symbol and/or block symbol group and/or transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g., predefined and/or configured or configurable, number of symbols, e.g., 6 or 7, or 12 or 14. A mini-slot may comprise a number of symbols (which may in particular be configurable or configured) smaller than the number of symbols of a slot, in particular 1, 2, 3 or 4, or more symbols, e.g., less symbols than symbols in a slot. A transmission timing structure may cover a time interval of a specific length, which may be dependent on symbol time length and/or cyclic prefix used. A transmission timing structure may pertain to, and/or cover, a specific time interval in a time stream, e.g., synchronized for communication. Timing structures used and/or scheduled for transmission, e.g., slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g., radio waves or microwaves, and/or optically transmissive material, e.g., glass fiber, and/or cable. A storage medium may comprise at least one of a memory, which may be volatile or non-volatile, a buffer, a cache, an optical disc, magnetic memory, flash memory, etc.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered. Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g., by triggering a different system or node to stream and/or transfer and/or send and/or pass on the information. The information system may comprise, and/or be connected or connectable to, a target, for example via one or more intermediate systems, e.g., a core network and/or internet and/or private or local network. Information may be provided utilising and/or via such intermediate system/s. Providing information may be for radio transmission and/or for transmission via an air interface and/or utilising a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, respectively one or more estimates thereof. The target indication may be provided by the target, or determined by the information system, e.g., based on information received from the target and/or historical information, and/or be provided by a user, for example a user operating the target or a device in communication with the target, e.g., via the RAN and/or air interface. For example, a user may indicate on a user equipment communicating with the information system that information is to be provided via a RAN, e.g., by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g., a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g., video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signalling and/or one or more data channels as described herein (which may be signalling or channel/s of an air interface and/or used within a RAN and/or for radio transmission). It may be considered that the information is formatted based on the target indication and/or target, e.g., regarding data amount and/or data rate and/or data structure and/or timing, which in particular may be pertaining to a mapping to communication or data signalling and/or a data channel. Mapping information to data signalling and/or data channel/s may be considered to refer to using the signalling/channel/s to carry the data, e.g., on higher layers of communication, with the signalling/channel/s underlying the transmission. A target indication generally may comprise different components, which may have different sources, and/or which may indicate different characteristics of the target and/or communication path/s thereto. A format of information may be specifically selected, e.g., from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g., if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signalling carrying information, and/or operating on, and/or presenting (e.g., on a screen and/or as audio or as other form of indication), information. The information may be based on received information and/or communication signalling carrying information. Presenting information may comprise processing received information, e.g., decoding and/or transforming, in particular between different formats, and/or hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signalling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g., on an air interface, which may include mapping the information onto signalling (such mapping may generally pertain to one or more layers, e.g., one or more layers of an air interface, e.g., RLC (Radio Link Control) layer and/or MAC layer and/or physical layer/s). The information may be imprinted (or mapped) on communication signalling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g., for providing and/or selecting the target indication, and/or presenting, e.g., video and/or audio, and/or operating on and/or storing received information. Providing a target indication may comprise transmitting or transferring the indication as signalling, and/or carried on signalling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g., application layer or user-layer, in particular above radio layers like transport layer and physical layer. The target indication may be mapped on physical layer radio signalling, e.g., related to or on the user-plane, and/or the information may be mapped on physical layer radio communication signalling, e.g., related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g., in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier, and/or the symbol time length. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths, even on the same carrier.

Signalling may generally comprise one or more (e.g., modulation) symbols and/or signals and/or messages. A signal may comprise or represent one or more bits. An indication may represent signalling, and/or be implemented as a signal, or as a plurality of signals. One or more signals may be included in and/or represented by a message. Signalling, in particular control signalling, may comprise a plurality of signals and/or messages, which may be transmitted on different carriers and/or be associated to different signalling processes, e.g., representing and/or pertaining to one or more such processes and/or corresponding information. An indication may comprise signalling, and/or a plurality of signals and/or messages and/or may be comprised therein, which may be transmitted on different carriers and/or be associated to different acknowledgement signalling processes, e.g., representing and/or pertaining to one or more such processes. Signalling associated to a channel may be transmitted such that represents signalling and/or information for that channel, and/or that the signalling is interpreted by the transmitter and/or receiver to belong to that channel. Such signalling may generally comply with transmission parameters and/or format/s for the channel.

An antenna arrangement may comprise one or more antenna elements (radiating elements), which may be combined in antenna arrays. An antenna array or subarray may comprise one antenna element, or a plurality of antenna elements, which may be arranged e.g., two dimensionally (for example, a panel) or three dimensionally. It may be considered that each antenna array or subarray or element is separately controllable, respectively that different antenna arrays are controllable separately from each other. A single antenna element/radiator may be considered the smallest example of a subarray. Examples of antenna arrays comprise one or more multi-antenna panels or one or more individually controllable antenna elements. An antenna arrangement may comprise a plurality of antenna arrays. It may be considered that an antenna arrangement is associated to a (specific and/or single) radio node, e.g., a configuring or informing or scheduling radio node, e.g., to be controlled or controllable by the radio node. An antenna arrangement associated to a UE or terminal may be smaller (e.g., in size and/or number of antenna elements or arrays) than the antenna arrangement associated to a network node. Antenna elements of an antenna arrangement may be configurable for different arrays, e.g., to change the beamforming characteristics. In particular, antenna arrays may be formed by combining one or more independently or separately controllable antenna elements or subarrays. The beams may be provided by analog beamforming, or in some variants by digital beamforming, or by hybrid beamforming combing analog and digital beamforming. The informing radio nodes may be configured with the manner of beam transmission, e.g., by transmitting a corresponding indicator or indication, for example as beam identify indication. However, there may be considered cases in which the informing radio node/s are not configured with such information, and/or operate transparently, not knowing the way of beamforming used. An antenna arrangement may be considered separately controllable in regard to the phase and/or amplitude/power and/or gain of a signal feed to it for transmission, and/or separately controllable antenna arrangements may comprise an independent or separate transmit and/or receive unit and/or ADC (Analog-Digital-Converter, alternatively an ADC chain) or DCA (Digital-to-Analog Converter, alternatively a DCA chain) to convert digital control information into an analog antenna feed for the whole antenna arrangement (the ADC/DCA may be considered part of, and/or connected or connectable to, antenna circuitry) or vice versa. A scenario in which an ADC or DCA is controlled directly for beamforming may be considered an analog beamforming scenario; such controlling may be performed after encoding/decoding and/or after modulation symbols have been mapped to resource elements. This may be on the level of antenna arrangements using the same ADC/DCA, e.g., one antenna element or a group of antenna elements associated to the same ADC/DCA. Digital beamforming may correspond to a scenario in which processing for beamforming is provided before feeding signalling to the ADC/DCA, e.g., by using one or more precoder/s and/or by precoding information, for example before and/or when mapping modulation symbols to resource elements. Such a precoder for beamforming may provide weights, e.g., for amplitude and/or phase, and/or may be based on a (precoder) codebook, e.g., selected from a codebook. A precoder may pertain to one beam or more beams, e.g., defining the beam or beams. The codebook may be configured or configurable, and/or be predefined. DFT beamforming may be considered a form of digital beamforming, wherein a DFT procedure is used to form one or more beams. Hybrid forms of beamforming may be considered.

A beam may be defined by a spatial and/or angular and/or spatial angular distribution of radiation and/or a spatial angle (also referred to as solid angle) or spatial (solid) angle distribution into which radiation is transmitted (for transmission beamforming) or from which it is received (for reception beamforming). Reception beamforming may comprise only accepting signals coming in from a reception beam (e.g., using analog beamforming to not receive outside reception beam/s), and/or sorting out signals that do not come in in a reception beam, e.g., in digital postprocessing, e.g., digital beamforming. A beam may have a solid angle equal to or smaller than 4*pi sr (4*pi correspond to a beam covering all directions), in particular smaller than 2*pi, or pi, or pi/2, or pi/4 or pi/8 or pi/16. In particular for high frequencies, smaller beams may be used. Different beams may have different directions and/or sizes (e.g., solid angle and/or reach). A beam may have a main direction, which may be defined by a main lobe (e.g., center of the main lobe, e.g., pertaining to signal strength and/or solid angle, which may be averaged and/or weighted to determine the direction), and may have one or more sidelobes. A lobe may generally be defined to have a continuous or contiguous distribution of energy and/or power transmitted and/or received, e.g., bounded by one or more contiguous or contiguous regions of zero energy (or practically zero energy). A main lobe may comprise the lobe with the largest signal strength and/or energy and/or power content. However, sidelobes usually appear due to limitations of beamforming, some of which may carry signals with significant strength, and may cause multi-path effects. A sidelobe may generally have a different direction than a main lobe and/or other side lobes, however, due to reflections a sidelobe still may contribute to transmitted and/or received energy or power. A beam may be swept and/or switched over time, e.g., such that its (main) direction is changed, but its shape (angular/solid angle distribution) around the main direction is not changed, e.g., from the transmitter's views for a transmission beam, or the receiver's view for a reception beam, respectively. Sweeping may correspond to continuous or near continuous change of main direction (e.g., such that after each change, the main lobe from before the change covers at least partly the main lobe after the change, e.g., at least to 50 or 75 or 90 percent). Switching may correspond to switching direction non-continuously, e.g., such that after each change, the main lobe from before the change does not cover the main lobe after the change, e.g., at most to 50 or 25 or 10 percent.

In some cases, to one or more beams or signals or signalings may be associated a Quasi-CoLocation (QCL)

characteristic or set of characteristics, or QCL class (also referred to as QCL type) or QCL identity; beams or signal or signalings sharing such may be considered to be Quasi-Colocated. Quasi-Colocated beams or signals or signalings may be considered (e.g., by a receiver) as the same beam or originating from the same transmitter or transmission source, at least in regard to the QCL characteristic or set or class or identity, and/or to share the characteristic/s. QCL characteristics may pertain to propagation of signalling, and/or one or more delay characteristics, and/or pathloss, and/or signal quality, and/or signal strength, and/or beam direction, and/or beam shape (in particular, angle or area, e.g., area of coverage), and/or Doppler shift, and/or Doppler spread, and/or delay spread, and/or time synchronisation, and/or frequency synchronisation, and/or one or more other parameters, e.g., pertaining to a propagation channel and/or spatial RX parameter/s (which may refer to reception beam and/or transmission beam, e.g., shape or coverage or direction). A QCL characteristic may pertain to a specific channel (e.g., physical layer channel like a control channel or data channel) and/or reference signalling type and/or antenna port. Different QCL classes or types may pertain to different QCL characteristics or sets of characteristics; a QCL class may define and/or pertain to one or more criteria and/or thresholds and/or ranges for one or more QCL characteristics beams have to fulfill to be considered Quasi-Colocated according to this class; a QCL identity may refer to and/or represent all beams being quasi-colocated, according to a QCL class. Different classes may pertain to one or more of the same characteristics (e.g., different classes may have different criteria and/or thresholds and/or ranges for one or more characteristics) and/or to different characteristics. A QCL indication may be seen as a form of beam indication, e.g., pertaining to all beams belonging to one QCL class and/or QCL identity and/or quasi-colocated beams. A QCL identity may be indicated by a QCL indication. In some cases, a beam, and/or a beam indication, may be considered to refer and/or represent a to a QCL identity, and/or to represent quasi-colocated beams or signals or signalings. To a QCL identity, there may be associated one or more ports, e.g., for one or more reference signalling types, e.g., DM-RS and/or CSI-RS and/or PT-RS. A QCI class or identity may be indicated by, and/or represented by, and/or be associated to a Transmission Configuration Indicator (TCI), which may be indicated with control signalling, e.g., in a DCI.

Transmission on multiple layers (multi-layer transmission) may refer to transmission of communication signalling and/or reference signalling simultaneously in one or more beams and/or using a plurality of transmission sources, e.g., controlled by one network node or one wireless device. The layers may refer to layers of transmission; a layer may be considered to represent one data or signalling stream. Different layers may carry different data and/or data streams, e.g., to increase data throughput. In some cases, the same data or data stream may be transported on different layers, e.g., to increase reliability. Multi-layer transmission may provide diversity, e.g., transmission diversity and/or spatial diversity. It may be considered that multi-layer transmission comprises 2, or more than 2 layers; the number of layers of transmission may be represented by a rank or rank indication.

Signal strength may be a representation of signal power and/or signal energy, e.g., as seen from a transmitting node or a receiving node. A beam with larger strength at transmission (e.g., according to the beamforming used) than another beam does may not necessarily have larger strength at the receiver, and vice versa, for example due to interference and/or obstruction and/or dispersion and/or absorption and/or reflection and/or attrition or other effects influencing a beam or the signalling it carries. Signal quality may in general be a representation of how well a signal may be received over noise and/or interference. A beam with better signal quality than another beam does not necessarily have a larger beam strength than the other beam. Signal quality may be represented for example by SIR, SNR, SINR, BER, BLER, Energy per resource element over noise/interference or another corresponding quality measure. Signal quality and/or signal strength may pertain to, and/or may be measured with respect to, a beam, and/or specific signalling carried by the beam, e.g., reference signalling and/or a specific channel, e.g., a data channel or control channel. Signal strength may be represented by received signal strength (e.g., as RSRP), and/or relative signal strength, e.g., in comparison to a reference signal (strength), or Energy per resource element or a transmitter power.

Uplink or sidelink signalling may be OFDMA (Orthogonal Frequency Division Multiple Access) or SC-FDMA (Single Carrier Frequency Division Multiple Access) signalling. Downlink signalling may in particular be OFDMA signalling. However, signalling is not limited thereto (Filter-Bank based signalling and/or Single-Carrier based signalling, e.g., SC-FDE signalling, may be considered alternatives).

A radio node may generally be considered a device or node adapted for wireless and/or radio (and/or millimeter wave) frequency communication, and/or for communication utilising an air interface, e.g., according to a communication standard.

A radio node may be a network node, or a user equipment or terminal. A network node may be any radio node of a wireless communication network, e.g., a base station and/or gNodeB (gNB) and/or eNodeB (eNB) and/or relay node and/or micro/nano/pico/femto node and/or transmission point (TP) and/or access point (AP) and/or other node, in particular for a RAN or other wireless communication network as described herein.

The terms user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary. A wireless device generally may comprise, and/or be implemented as, processing circuitry and/or radio circuitry, which may comprise one or more chips or sets of chips. The circuitry and/or circuitries may be packaged, e.g., in a chip housing, and/or may have one or more physical interfaces to interact with other circuitry and/or for power supply. Such a wireless device may be intended for use in a user equipment or terminal.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g., in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g., 2D or 3D array, and/or antenna panels. A remote radio head (RRH) may be considered as an example of an antenna array. However, in some variants, an RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g., laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g., controlled by communication circuitry and/or processing circuitry.

Any one or any combination or all of modules disclosed herein may be implemented in software and/or firmware and/or hardware. Different modules may be associated to different components of a radio node, e.g., different circuitries, or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A wireless communication network may be or comprise a radio access network and/or a backhaul network (e.g., a relay or backhaul network or an IAB network), and/or a Radio Access Network (RAN) in particular according to a communication standard. A communication standard may in particular a standard according to 3GPP and/or 5G, e.g., according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g., LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g., a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g., a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g., for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signalling (control signalling) may be transmitted on a control channel, e.g., a physical control channel, which may be a downlink channel or (or a sidelink channel in some cases, e.g., one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signalling, e.g., as a form of control information or signalling like uplink control information/signalling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signalling.

Scheduling may comprise indicating, e.g., with control signalling like DCI or SCI signalling and/or signalling on a control channel like PDCCH or PSCCH, one or more scheduling opportunities of a configuration intended to carry data signalling or subject signalling. The configuration may be represented or representable by, and/or correspond to, a table. A scheduling assignment may for example point to an opportunity of the reception allocation configuration, e.g., indexing a table of scheduling opportunities. In some cases, a reception allocation configuration may comprise 15 or 16 scheduling opportunities. The configuration may in particular represent allocation in time. It may be considered that the reception allocation configuration pertains to data signalling, in particular on a physical data channel like PDSCH or PSSCH. In general, the reception allocation configuration may pertain to downlink signalling, or in some scenarios to sidelink signalling. Control signalling scheduling subject transmission like data signalling may point and/or index and/or refer to and/or indicate a scheduling opportunity of the reception allocation configuration. It may be considered that the reception allocation configuration is configured or configurable with higher-layer signalling, e.g., RRC or MAC layer signalling. The reception allocation configuration may be applied and/or applicable and/or valid for a plurality of transmission timing intervals, e.g., such that for each interval, one or more opportunities may be indicated or allocated for data signalling. These approaches allow efficient and flexible scheduling, which may be semi-static, but may updated or reconfigured on useful timescales in response to changes of operation conditions.

Signalling may generally be considered to represent an electromagnetic wave structure (e.g., over a time interval and frequency interval), which is intended to convey information to at least one specific or generic (e.g., anyone who might pick up the signalling) target. A process of signalling may comprise transmitting the signalling. Transmitting signalling, in particular control signalling or communication signalling, e.g., comprising, or representing acknowledgement signalling and/or resource requesting information, may comprise encoding and/or modulating. Encoding and/or modulating may comprise error detection coding and/or forward error correction encoding and/or scrambling. Receiving signalling like control signalling or data signalling may comprise corresponding decoding and/or demodulation, e.g., based on reference signalling associated to the signalling to be received. Error detection coding may comprise, and/or be based on, parity or checksum approaches, e.g., CRC (Cyclic Redundancy Check). Forward error correction coding may comprise and/or be based on for example turbo coding and/or Reed-Muller coding, and/or Polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Transmitting acknowledgement signalling may in general be based on and/or in response to subject transmission, and/or to control signalling scheduling subject transmission. Such control signalling and/or subject signalling may be transmitted by a signalling radio node (which may be a network node, and/or a node associated to it, e.g., in a dual connectivity scenario. Subject transmission and/or subject signalling may be transmission or signalling to which ACK/NACK or acknowledgement information pertains, e.g., indicating correct or incorrect reception and/or decoding of the subject transmission or signalling. Subject signalling or transmission may in particular comprise and/or be represented by data signalling, e.g., on a PDSCH or PSSCH, or some forms of control signalling, e.g., on a PDCCH or PSSCH, for example for specific formats.

Scheduling may comprise indicating, e.g., with control signalling like DCI or SCI signalling and/or signalling on a control channel like PDCCH or PSCCH, one or more scheduling opportunities of a configuration intended to carry data signalling or subject signalling. The configuration may be represented or representable by, and/or correspond to, a table. A scheduling assignment may for example point to an opportunity of the reception allocation configuration, e.g., indexing a table of scheduling opportunities. In some cases, a reception allocation configuration may comprise 15 or 16 scheduling opportunities. The configuration may in particular represent allocation in time. It may be considered that the reception allocation configuration pertains to data signalling, in particular on a physical data channel like PDSCH or PSSCH. In general, the reception allocation configuration may pertain to downlink signalling, or in some scenarios to sidelink signalling. Control signalling scheduling subject transmission like data signalling may point and/or index and/or refer to and/or indicate a scheduling opportunity of the reception allocation configuration. It may be considered that the reception allocation configuration is configured or configurable with higher-layer signalling, e.g., RRC or MAC layer signalling. The reception allocation configuration may be applied and/or applicable and/or valid for a plurality of transmission timing intervals, e.g., such that for each interval, one or more opportunities may be indicated or allocated for data signalling. These approaches allow efficient and flexible scheduling, which may be semi-static, but may updated or reconfigured on useful timescales in response to changes of operation conditions.

Control information, e.g., in a control information message, in this context may in particular be implemented as and/or represented by a scheduling assignment, which may indicate subject transmission for feedback (transmission of acknowledgement signalling), and/or reporting timing and/or frequency resources and/or code resources. Reporting timing may indicate a timing for scheduled acknowledgement signalling, e.g., slot and/or symbol and/or resource set. Control information may be carried by control signalling.

Subject transmissions may comprise one or more individual transmissions. Scheduling assignments may comprise one or more scheduling assignments. It should generally be noted that in a distributed system, subject transmissions, configuration and/or scheduling may be provided by different nodes or devices or transmission points. Different subject transmissions may be on the same carrier or different carriers (e.g., in a carrier aggregation), and/or same or different bandwidth parts, and/or on the same or different layers or beams, e.g., in a MIMO scenario, and/or to same or different ports. Generally, subject transmissions may pertain to different HARQ or ARQ processes (or different sub-processes, e.g., in MIMO with different beams/layers associated to the same process identifier, but different sub-process-identifiers like swap bits). A scheduling assignment and/or a HARQ codebook may indicate a target HARQ structure. A target HARQ structure may for example indicate an intended HARQ response to a subject transmission, e.g., the number of bits and/or whether to provide code block group level response or not. However, it should be noted that the actual structure used may differ from the target structure, e.g., due to the total size of target structures for a subpattern being larger than the predetermined size.

Transmitting acknowledgement signalling, also referred to as transmitting acknowledgement information or feedback information or simply as ARQ or HARQ feedback or feedback or reporting feedback, may comprise, and/or be based on determining correct or incorrect reception of subject transmission/s, e.g., based on error coding and/or based on scheduling assignment/s scheduling the subject transmissions. Transmitting acknowledgement information may be based on, and/or comprise, a structure for acknowledgement information to transmit, e.g., the structure of one or more subpatterns, e.g., based on which subject transmission is scheduled for an associated subdivision. Transmitting acknowledgement information may comprise transmitting corresponding signalling, e.g., at one instance and/or in one message and/or one channel, in particular a physical channel, which may be a control channel. In some cases, the channel may be a shared channel or data channel, e.g., utilising rate-matching of the acknowledgment information. The acknowledgment information may generally pertain to a plurality of subject transmissions, which may be on different channels and/or carriers, and/or may comprise data signalling and/or control signalling. The acknowledgment information may be based on a codebook, which may be based on one or more size indications and/or assignment indications (representing HARQ structures), which may be received with a plurality of control signalings and/or control messages, e.g., in the same or different transmission timing structures, and/or in the same or different (target) sets of resources. Transmitting acknowledgement information may comprise determining the codebook, e.g., based on control information in one or more control information messages and/or a configuration. A codebook may pertain to transmitting acknowledgement information at a single and/or specific instant, e.g., a single PUCCH or PUSCH transmission, and/or in one message or with jointly encoded and/or modulated acknowledgement information. Generally, acknowledgment information may be transmitted together with other control information, e.g., a scheduling request and/or measurement information.

Acknowledgement signalling may in some cases comprise, next to acknowledgement information, other information, e.g., control information, in particular, uplink or sidelink control information, like a scheduling request and/or measurement information, or similar, and/or error detection and/or correction information, respectively associated bits. The payload size of acknowledgement signalling may represent the number of bits of acknowledgement information, and/or in some cases the total number of bits carried by the acknowledgement signalling, and/or the number of resource elements needed. Acknowledgement signalling and/or information may pertain to ARQ and/or HARQ processes; an ARQ process may provide ACK/NACK (and perhaps additional feedback) feedback, and decoding may be performed on each (re-)transmission separately, without soft-buffering/soft-combining intermediate data, whereas HARQ may comprise soft-buffering/soft-combining of intermediate data of decoding for one or more (re-)transmissions.

Subject transmission may be data signalling or control signalling. The transmission may be on a shared or dedicated channel. Data signalling may be on a data channel, for example on a PDSCH or PSSCH, or on a dedicated data channel, e.g., for low latency and/or high reliability, e.g., a URLLC channel. Control signalling may be on a control channel, for example on a common control channel or a PDCCH or PSCCH, and/or comprise one or more DCI messages or SCI messages. In some cases, the subject transmission may comprise, or represent, reference signalling. For example, it may comprise DM-RS and/or pilot signalling and/or discovery signalling and/or sounding signalling and/or phase tracking signalling and/or cell-specific reference signalling and/or user-specific signalling, in particular CSI-RS. A subject transmission may pertain to one scheduling assignment and/or one acknowledgement signalling process (e.g., according to identifier or subidentifier), and/or one subdivision. In some cases, a subject transmission may cross the borders of subdivisions in time, e.g., due to being scheduled to start in one subdivision and extending into another, or even crossing over more than one subdivision. In this case, it may be considered that the subject transmission is associated to the subdivision it ends in.

It may be considered that transmitting acknowledgement information, in particular of acknowledgement information, is based on determining whether the subject transmission/s has or have been received correctly, e.g., based on error coding and/or reception quality. Reception quality may for example be based on a determined signal quality. Acknowledgement information may generally be transmitted to a signalling radio node and/or node arrangement and/or to a network and/or network node.

Acknowledgement information, or bit/s of a subpattern structure of such information (e.g., an acknowledgement information structure, may represent and/or comprise one or more bits, in particular a pattern of bits. Multiple bits pertaining to a data structure or substructure or message like a control message may be considered a subpattern. The structure or arrangement of acknowledgement information may indicate the order, and/or meaning, and/or mapping, and/or pattern of bits (or subpatterns of bits) of the information. The structure or mapping may in particular indicate one or more data block structures, e.g., code blocks and/or code block groups and/or transport blocks and/or messages, e.g., command messages, the acknowledgement information pertains to, and/or which bits or subpattern of bits are associated to which data block structure. In some cases, the mapping may pertain to one or more acknowledgement signalling processes, e.g., processes with different identifiers, and/or one or more different data streams. The configuration or structure or codebook may indicate to which process/es and/or data stream/s the information pertains. Generally, the acknowledgement information may comprise one or more subpatterns, each of which may pertain to a data block structure, e.g., a code block or code block group or transport block. A subpattern may be arranged to indicate acknowledgement or non-acknowledgement, or another retransmission state like non-scheduling or non-reception, of the associated data block structure. It may be considered that a subpattern comprises one bit, or in some cases more than one bit. It should be noted that acknowledgement information may be subjected to significant processing before being transmitted with acknowledgement signalling. Different configurations may indicate different sizes and/or mapping and/or structures and/or pattern.

An acknowledgment signalling process (providing acknowledgment information) may be a HARQ process, and/or be identified by a process identifier, e.g., a HARQ process identifier or sub-identifier. Acknowledgement signalling and/or associated acknowledgement information may be referred to as feedback or acknowledgement feedback. It should be noted that data blocks or structures to which subpatterns may pertain may be intended to carry data (e.g., information and/or systemic and/or coding bits). However, depending on transmission conditions, such data may be received or not received (or not received correctly), which may be indicated correspondingly in the feedback. In some cases, a subpattern of acknowledgement signalling may comprise padding bits, e.g., if the acknowledgement information for a data block requires fewer bits than indicated as size of the subpattern. Such may for example happen if the size is indicated by a unit size larger than required for the feedback.

Acknowledgment information may generally indicate at least ACK or NACK, e.g., pertaining to an acknowledgment signalling process, or an element of a data block structure like a data block, subblock group or subblock, or a message, in particular a control message. Generally, to an acknowledgment signalling process there may be associated one specific subpattern and/or a data block structure, for which acknowledgment information may be provided. Acknowledgement information may comprise a plurality of pieces of information, represented in a plurality of ARQ and/or HARQ structures.

An acknowledgment signalling process may determine correct or incorrect reception, and/or corresponding acknowledgement information, of a data block like a transport block, and/or substructures thereof, based on coding bits associated to the data block, and/or based on coding bits associated to one or more data block and/or subblocks and/or subblock group/s. Acknowledgement information (determined by an acknowledgement signalling process) may pertain to the data block as a whole, and/or to one or more subblocks or subblock groups. A code block may be considered an example of a subblock, whereas a code block group may be considered an example of a subblock group. Accordingly, the associated subpattern may comprise one or more bits indicating reception status or feedback of the data block, and/or one or more bits indicating reception status or feedback of one or more subblocks or subblock groups. Each subpattern or bit of the subpattern may be associated and/or mapped to a specific data block or subblock or subblock group. In some variants, correct reception for a data block may be indicated if all subblocks or subblock groups are correctly identified. In such a case, the subpattern may represent acknowledgement information for the data block as a whole, reducing overhead in comparison to provide acknowledgement information for the subblocks or subblock groups. The smallest structure (e.g., subblock/subblock group/data block) the subpattern provides acknowledgement information for and/or is associated to may be considered its (highest) resolution. In some variants, a subpattern may provide acknowledgment information regarding several elements of a data block structure and/or at different resolution, e.g., to allow more specific error detection. For example, even if a subpattern indicates acknowledgment signalling pertaining to a data block as a whole, in some variants higher resolution (e.g., subblock or subblock group resolution) may be provided by the subpattern. A subpattern may generally comprise one or more bits indicating ACK/NACK for a data block, and/or one or more bits for indicating ACK/NACK for a subblock or subblock group, or for more than one subblock or subblock group.

A subblock and/or subblock group may comprise information bits (representing the data to be transmitted, e.g., user data and/or downlink/sidelink data or uplink data). It may be considered that a data block and/or subblock and/or subblock group also comprises error one or more error detection bits, which may pertain to, and/or be determined based on, the information bits (for a subblock group, the error detection bit/s may be determined based on the information bits and/or error detection bits and/or error correction bits of the subblock/s of the subblock group). A data block or substructure like subblock or subblock group may comprise error correction bits, which may in particular be determined based on the information bits and error detection bits of the block or substructure, e.g., utilising an error correction coding scheme, in particular for forward error correction (FEC), e.g., LDPC or Polar coding and/or turbo coding. Generally, the error correction coding of a data block structure (and/or associated bits) may cover and/or pertain to information bits and error detection bits of the structure. A subblock group may represent a combination of one or more code blocks, respectively the corresponding bits. A data block may represent a code block or code block group, or a combination of more than one code block groups. A transport block may be split up in code blocks and/or code block groups, for example based on the bit size of the information bits of a higher layer data structure provided for error coding and/or size requirements or preferences for error coding, in particular error correction coding. Such a higher layer data structure is sometimes also referred to as transport block, which in this context represents information bits without the error coding bits described herein, although higher layer error handling information may be included, e.g., for an internet protocol like TCP. However, such error handling information represents information bits in the context of this disclosure, as the acknowledgement signalling procedures described treat it accordingly.

In some variants, a subblock like a code block may comprise error correction bits, which may be determined based on the information bit/s and/or error detection bit/s of the subblock. An error correction coding scheme may be used for determining the error correction bits, e.g., based on LDPC or Polar coding or Reed-Mueller coding. In some cases, a subblock or code block may be considered to be defined as a block or pattern of bits comprising information bits, error detection bit/s determined based on the information bits, and error correction bit/s determined based on the information bits and/or error detection bit/s. It may be considered that in a subblock, e.g., code block, the information bits (and possibly the error correction bit/s) are protected and/or covered by the error correction scheme or corresponding error correction bit/s. A code block group may comprise one or more code blocks. In some variants, no additional error detection bits and/or error correction bits are applied, however, it may be considered to apply either or both. A transport block may comprise one or more code block groups. It may be considered that no additional error detection bits and/or error correction bits are applied to a transport block, however, it may be considered to apply either or both. In some specific variants, the code block group/s comprise no additional layers of error detection or correction coding, and the transport block may comprise only additional error detection coding bits, but no additional error correction coding. This may particularly be true if the transport block size is larger than the code block size and/or the maximum size for error correction coding. A subpattern of acknowledgement signalling (in particular indicating ACK or NACK) may pertain to a code block, e.g., indicating whether the code block has been correctly received. It may be considered that a subpattern pertains to a subgroup like a code block group or a data block like a transport block. In such cases, it may indicate ACK, if all subblocks or code blocks of the group or data/transport block are received correctly (e.g., based on a logical AND operation), and NACK or another state of non-correct reception if at least one subblock or code block has not been correctly received. It should be noted that a code block may be considered to be correctly received not only if it actually has been correctly received, but also if it can be correctly reconstructed based on soft-combining and/or the error correction coding.

A subpattern/HARQ structure may pertain to one acknowledgement signalling process and/or one carrier like a component carrier and/or data block structure or data block. It may in particular be considered that one (e.g., specific and/or single) subpattern pertains, e.g., is mapped by the codebook, to one (e.g., specific and/or single) acknowledgement signalling process, e.g., a specific and/or single HARQ process. It may be considered that in the bit pattern, subpatterns are mapped to acknowledgement signalling processes and/or data blocks or data block structures on a one-to-one basis. In some variants, there may be multiple subpatterns (and/or associated acknowledgment signalling processes) associated to the same component carrier, e.g., if multiple data streams transmitted on the carrier are subject to acknowledgement signalling processes. A subpattern may comprise one or more bits, the number of which may be considered to represent its size or bit size. Different bit n-tupels (n being 1 or larger) of a subpattern may be associated to different elements of a data block structure (e.g., data block or subblock or subblock group), and/or represent different resolutions. There may be considered variants in which only one resolution is represented by a bit pattern, e.g., a data block. A bit n-tupel may represent acknowledgement information (also referred to a feedback), in particular ACK or NACK, and optionally, (if n>1), may represent DTX/DRX or other reception states. ACK/NACK may be represented by one bit, or by more than one bit, e.g., to improve disambiguity of bit sequences representing ACK or NACK, and/or to improve transmission reliability.

The acknowledgement information or feedback information may pertain to a plurality of different transmissions, which may be associated to and/or represented by data block structures, respectively the associated data blocks or data signalling. The data block structures, and/or the corresponding blocks and/or signalling, may be scheduled for simultaneous transmission, e.g., for the same transmission timing structure, in particular within the same slot or subframe, and/or on the same symbol/s. However, alternatives with scheduling for non-simultaneous transmission may be considered. For example, the acknowledgment information may pertain to data blocks scheduled for different transmission timing structures, e.g., different slots (or mini-slots, or slots and mini-slots) or similar, which may correspondingly be received (or not or wrongly received). Scheduling signalling may generally comprise indicating resources, e.g., time and/or frequency resources, for example for receiving or transmitting the scheduled signalling.

Communication signalling may comprise, and/or represent, and/or be implemented as, data signalling, and/or user plane signalling. Communication signalling may be associated to a data channel, e.g., a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signalling may be signalling associated to and/or on a data channel.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signalling as described herein, based on the utilised resource sequence, implicitly indicates the control signalling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g., as defined by a standard. A carrier may define a frequency and/or frequency band for transmission and/or reception. In some variants, a signal (jointly encoded/modulated) may cover more than one resource elements. A resource element may generally be as defined by a corresponding standard, e.g., NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signalling, e.g., according to a specific format, may be communicated, for example transmitted and/or received, and/or be intended for transmission and/or reception.

A border symbol (or allocation unit) may generally represent a starting symbol (allocation unit) or an ending symbol (allocation unit) for transmitting and/or receiving. A starting symbol (or allocation unit) may in particular be a starting symbol of uplink or sidelink signalling, for example control signalling or data signalling. Such signalling may be on a data channel or control channel, e.g., a physical channel, in particular a physical uplink shared channel (like PUSCH) or a sidelink data or shared channel, or a physical uplink control channel (like PUCCH) or a sidelink control channel. If the starting symbol (or allocation unit) is associated to control signalling (e.g., on a control channel), the control signalling may be in response to received signalling (in sidelink or downlink), e.g., representing acknowledgement signalling associated thereto, which may be HARQ or ARQ signalling. An ending symbol (or allocation unit) may represent an ending symbol (in time) of downlink or sidelink transmission or signalling, which may be intended or scheduled for the radio node or user equipment. Such downlink signalling may in particular be data signalling, e.g., on a physical downlink channel like a shared channel, e.g., a PDSCH (Physical Downlink Shared Channel). A starting symbol (or allocation unit) may be determined based on, and/or in relation to, such an ending symbol (or allocation unit).

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g., a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g., transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g., downlink data and/or downlink control signalling and/or DCI and/or uplink control or data or communication signalling, in particular acknowledgement signalling, and/or configuring resources and/or a resource pool therefor.

A resource structure may be considered to be neighbored in frequency domain by another resource structure, if they share a common border frequency, e.g., one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g., one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may in general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g., a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g., due to circuitry and/or configuration and/or regulations and/or a standard. A bandwidth part may be configured or configurable to a radio node. In some variants, a bandwidth part may be the part of a bandwidth used for communicating, e.g., transmitting and/or receiving, by a radio node. The bandwidth part may be smaller than the bandwidth (which may be a device bandwidth defined by the circuitry/configuration of a device, and/or a system bandwidth, e.g., available for a RAN). It may be considered that a bandwidth part comprises one or more resource blocks or resource block groups, in particular one or more PRBs or PRB groups. A bandwidth part may pertain to, and/or comprise, one or more carriers. A resource structure may in time domain comprise and/or represent a time interval, e.g., one of more allocation units and/or symbols and/or slots and/or subframes. In general, any reference to a symbol as a time interval may be considered as a reference to an allocation unit as a more general term, unless the reference to the symbol is specific, e.g., referring to a specific division or modulation technique, or to modulation symbols as transmission structures.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g., represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising millimeter waves, in particular above one of the thresholds 10 GHz or 20 GHz or 50 GHz or 52 GHz or 52.6 GHz or 60 GHz or 72 GHz or 100 GHz or 114 GHz. Such communication may utilise one or more carriers, e.g., in FDD and/or carrier aggregation. Upper frequency boundaries may correspond to 300 GHz or 200 GHz or 120 GHz or any of the thresholds larger than the one representing the lower frequency boundary.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on an LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signalling/control information may be considered a control channel, in particular if it is a physical layer channel and/or if it carries control plane information. Analogously, a channel carrying and/or for carrying data signalling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g., prefix or postfix.

A sidelink may generally represent a communication channel (or channel structure) between two UEs and/or terminals, in which data is transmitted between the participants (UEs and/or terminals) via the communication channel, e.g., directly and/or without being relayed via a network node. A sidelink may be established only and/or directly via air interface/s of the participant, which may be directly linked via the sidelink communication channel. In some variants, sidelink communication may be performed without interaction by a network node, e.g., on fixedly defined resources and/or on resources negotiated between the participants. Alternatively, or additionally, it may be considered that a network node provides some control functionality, e.g., by configuring resources, in particular one or more resource pool/s, for sidelink communication, and/or monitoring a sidelink, e.g., for charging purposes.

Sidelink communication may also be referred to as device-to-device (D2D) communication, and/or in some cases as ProSe (Proximity Services) communication, e.g., in the context of LTE. A sidelink may be implemented in the context of V2x communication (Vehicular communication), e.g., V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g., a PSCCH (Physical Sidelink Control CHannel, which may for example carry control information like an acknowledgement position indication, and/or a PSSCH (Physical Sidelink Shared CHannel, which for example may carry data and/or acknowledgement signalling). It may be considered that a sidelink communication channel (or structure) pertains to and/or used one or more carrier/s and/or frequency range/s associated to, and/or being used by, cellular communication, e.g., according to a specific license and/or standard. Participants may share a (physical) channel and/or resources, in particular in frequency domain and/or related to a frequency resource like a carrier) of a sidelink, such that two or more participants transmit thereon, e.g., simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g., an LTE-based standard and/or NR. A sidelink may utilise TDD (Time Division Duplex) and/or FDD (Frequency Division Duplex) technology, e.g., as configured by a network node, and/or preconfigured and/or negotiated between the participants. A user equipment may be considered to be adapted for sidelink communication if it, and/or its radio circuitry and/or processing circuitry, is adapted for utilising a sidelink, e.g., on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signalling. Communication on a sidelink (or sidelink signalling) may comprise utilising the sidelink for communication (respectively, for signalling). Sidelink transmission and/or transmitting on a sidelink may be considered to comprise transmission utilising the sidelink, e.g., associated resources and/or transmission formats and/or circuitry and/or the air interface. Sidelink reception and/or receiving on a sidelink may be considered to comprise reception utilising the sidelink, e.g., associated resources and/or transmission formats and/or circuitry and/or the air interface. Sidelink control information (e.g., SCI) may generally be considered to comprise control information transmitted utilising a sidelink.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g., stored in memory, for example independent of being configured. Configured or configurable may be considered to pertain to the corresponding information being set/configured, e.g., by the network or a network node.

A configuration or schedule, like a mini-slot configuration and/or structure configuration, may schedule transmissions, e.g., for the time/transmissions it is valid, and/or transmissions may be scheduled by separate signalling or separate configuration, e.g., separate RRC signalling and/or downlink control information signalling. The transmission/s scheduled may represent signalling to be transmitted by the device for which it is scheduled, or signalling to be received by the device for which it is scheduled, depending on which side of a communication the device is. It should be noted that downlink control information or specifically DCI signalling may be considered physical layer signalling, in contrast to higher layer signalling like MAC (Medium Access Control) signalling or RRC layer signalling. The higher the layer of signalling is, the less frequent/the more time/resource consuming it may be considered, at least partially due to the information contained in such signalling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g., PUSCH, PUCCH or PDSCH, and/or may pertain to a specific cell and/or carrier aggregation. A corresponding configuration, e.g., scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

A control region of a transmission timing structure may be an interval in time and/or frequency domain for intended or scheduled or reserved for control signalling, in particular downlink control signalling, and/or for a specific control channel, e.g., a physical downlink control channel like PDCCH. The interval may comprise, and/or consist of, a number of symbols in time, which may be configured or configurable, e.g., by (UE-specific) dedicated signalling (which may be single-cast, for example addressed to or intended for a specific UE), e.g., on a PDCCH, or RRC signalling, or on a multicast or broadcast channel. In general, the transmission timing structure may comprise a control region covering a configurable number of symbols. It may be considered that in general the border symbol is configured to be after the control region in time. A control region may be associated, e.g., via configuration and/or determination, to one or more specific UEs and/or formats of PDCCH and/or DCI and/or identifiers, e.g., UE identifiers and/or RNTIs or carrier/cell identifiers, and/or be represented and/or associated to a CORESET and/or a search space.

The duration of a symbol (symbol time length or interval or allocation unit) of the transmission timing structure may generally be dependent on a numerology and/or carrier, wherein the numerology and/or carrier may be configurable. The numerology may be the numerology to be used for the scheduled transmission.

A transmission timing structure may comprise a plurality of allocation units or symbols, and/or define an interval comprising several symbols or allocation units (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols and/or allocation units defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signalling is received, e.g., in relation to the timing grid. A transmission timing structure may in particular be a slot or subframe or in some cases, a mini-slot. In some cases, a timing structure may be represented by a frame structure. Timing structures may be associated to specific transmitters and/or cells and/or beams and/or signalings.

Signalling utilising, and/or on and/or associated to, resources or a resource structure may be signalling covering the resources or structure, signalling on the associated frequency/ies and/or in the associated time interval/s. It may be considered that a signalling resource structure comprises and/or encompasses one or more substructures, which may be associated to one or more different channels and/or types of signalling and/or comprise one or more holes (resource element/s not scheduled for transmissions or reception of transmissions). A resource substructure, e.g., a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g., time and/or frequency. The resource elements of a substructure may be scheduled for associated signalling.

Example types of signalling comprise signalling of a specific communication direction, in particular, uplink signalling, downlink signalling, sidelink signalling, as well as reference signalling (e.g., SRS or CRS or CSI-RS), communication signalling, control signalling, and/or signalling associated to a specific channel like PUSCH, PDSCH, PUCCH, PDCCH, PSCCH, PSSCH, etc.).

A signalling sequence may correspond to a sequence of modulation symbols (e.g., in time domain, or in frequency domain for an OFDM system). The signalling sequence may be predefined, or configured or configurable, e.g., to a wireless device. For OFDM or SC-FDM, each element of a signalling sequence may be mapped to a subcarrier; in general, for SC-based signalling, a corresponding mapping in time domain may be utilised (for example, such that each element may use essentially the full synchronisation bandwidth). A signalling sequence may comprise (ordered) modulation symbols, each modulation symbol representing a value of the sequence it is based on, e.g., based on the modulation scheme used and/or in a phase or constellation diagram; for some sequences like Zadoff-Chu sequences, there may be a mapping between non-integer sequence elements and transmitted waveform, which may not be represented in the context of a modulation scheme like BPSK or QPSK or higher. A signalling sequence may be a physical layer signalling or signal, which may be devoid of higher layer information. A signalling sequence may be based on a sequence, e.g., a bit sequence or symbol sequence and/or a modulation, e.g., performed on the sequence. Elements of a signalling sequence may be mapped to frequency domain (e.g., to subcarriers, in particular in a pattern like a comb structure or in interlaces) and/or in time domain, e.g., to one or more allocation units or symbol time intervals. A DFT-s-OFDM based waveform may be a waveform constructed by performing a DFT-spreading operation on modulation symbols mapped to a frequency interval (e.g., subcarriers), e.g., to provide a time-variable signal. A DFT-s-OFDM based waveform may also be referred to a SC-FDM waveform. It may be considered to provide good PAPR characteristics, allowing optimised operation of power amplifiers, in particular for high frequencies. In general, the approaches described herein may also be applicable to Single-Carrier based waveforms, e.g., FDE-based waveforms. Communication, e.g., on data channel/s and/or control channel/s, may be based on, and/o utilise, a DFT-s-OFDM based waveform, or a Single-Carrier based waveform.

A sequence may generally be considered to be based on a root sequence if it can be constructed from the root sequence (or represents it directly), e.g., by shifting in phase and/or frequency and/or time domain, and/or performing a cyclic shift and/or a cyclic extension, and/or copying/repeating and/or processing or operating on with a code, and/or interleaving or re-ordering of elements of the sequence, and/or extending or shortening the root sequence. A cyclic extension of a sequence may comprise taking a part of the sequence (in particular a border part like a tail or beginning) and appending it to the sequence, e.g., at the beginning or end, for example in time domain or frequency domain. Thus, a cyclic extended sequence may represent a (root) sequence and at least a part repetition of the (root) sequence. Operations described may be combined, in any order, in particular a shift and a cyclic extension. A cyclic shift in a domain may comprise shifting the sequence in the domain within an interval, such that the total number of sequence elements is constant, and the sequence is shifted as if the interval represented a ring (e.g., such that starting from the same sequence element, which may appear at different location in the interval), the order of elements is the same if the borders of the intervals are considered to be continuous, such that leaving one end of the interval leads to entering the interval at the other end). Processing and/or operating on with a code may correspond to constructing a sequence out of copies of a root sequence, wherein each copy is multiplied and/or operated on with an element of the code. Multiplying with an element of a code may represent and/or correspond to a shift (e.g., constant, or linear or cyclic) in phase and/or frequency and/or time domain, depending on representation. In the context of this disclosure, a sequence being based on and/or being constructed and/or processed may be any sequence that would result from such construction or processing, even if the sequence is just read from memory. Any isomorphic or equivalent or corresponding way to arrive at the sequence is considered to be included by such terminology; the construction thus may be considered to define the characteristics of the sequence and/or the sequence, not necessarily a specific way to construct them, as there may be multiple equivalent ways that are mathematically equivalent. Thus, a sequence "based on" or "constructed" or similar terminology may be considered to correspond to the sequence being "represented by" or "may be represented by" or "representable as".

A root sequence for a signalling sequence associated to one allocation unit may be basis for construction of a larger sequence. In this case, the larger sequence and/or the root sequence basis for its construction may be considered root sequence for signalling sequences associated to other allocation units.

For OFDM or SC-FDM, each element of a signalling sequence may be mapped to a subcarrier; in general, for SC-based signalling, a corresponding mapping in time domain may be utilised (such that each element may use essentially the full synchronisation bandwidth). A signalling sequence may comprise (ordered) modulation symbols, each modulation symbol representing a value of the sequence it is based on, e.g., based on the modulation scheme used and/or in a phase or constellation diagram; for some sequences like Zadoff-Chu sequences, there may be a mapping between non-integer sequence elements and transmitted waveform, which may not be represented in the context of a modulation scheme like BPSK or QPSK or higher.

A signalling sequence of an allocation unit may be based on a sequence root, e.g., a root sequence. A sequence root in general may represent or indicate a base for deriving or determining a signalling sequence; the root may be associated to, and/or represent a sequence directly, and/or indicate or represent a base sequence and/or seed. Examples of sequence roots may comprise a Zadoff Chu root sequence, a sequence seed, e.g., a seed for a Gold sequence, or a Golay complimentary sequence. A signalling sequence may be derived or derivable from, and/or be based on, a sequency root, e.g., based on a code, which may represent a shift or operation or processing on the root sequence or a sequence indicated by the sequence root, e.g., to provide the signalling sequence; the signalling sequence may be based on such shifted or processed or operated on root sequence. The code may in particular represent a cyclic shift and/or phase shift and/or phase ramp (e.g., an amount for such). The code may assign one operation or shift for each allocation unit.

In general, a signalling sequence associated to an allocation unit (and/or the allocation units) associated to control signalling (and/or reference signalling) may be based on a root sequence which may be a M-sequence or Zadoff-Chu sequence, or a Gold or Golay sequence, or another sequence with suitable characteristics regarding correlation and/or interference (e.g., self-interference and/or interference with other or neighboring transmitters). Different sequences may be used as root sequences for different signalling sequences, or the same sequence may be used. If different sequences are used, they may be of the same type (Gold, Golay, M- or Zadoff-Chu, for example). The (signalling and/or root) sequences may correspond to or be time-domain sequences, e.g., time domain Zadoff-Chu and/or time-domain M sequences.

In some cases, a shifted object like a signalling or signals or sequences or information may be shifted, e.g., relative to a predecessor (e.g., one is subject to a shift, and the shifted version is used), or relative to another (e.g., one associated to one signalling or allocation unit may be shifted to another associated to a second signalling or allocation unit, both may be used). One possible way of shifting is operating a code on it, e.g., to multiply each element of a shifting object with a factor. A ramping (e.g., multiplying with a monotonously increasing or periodic factor) may be considered an example of shifting. Another is a cyclic shift in a domain or interval. A cyclic shift (or circular shift) may correspond to a rearrangement of the elements in the shifting object, corresponding to moving the final element or elements to the first position, while shifting all other entries to the next position, or by performing the inverse operation (such that the shifted object as the result will have the same elements as the shifting object, in a shifted but similar order). Shifting in general may be specific to an interval in a domain, e.g., an allocation unit in time domain, or a bandwidth in frequency domain. For example, it may be considered that signals or modulation symbols in an allocation unit are shifted, such that the order of the modulation symbols or signals is shifted in the allocation unit. In another example, allocation units may be shifted, e.g., in a larger time interval—this may leave signals in the allocation units unshifted with reference to the individual allocation unit, but may change the order of the allocation units. Domains for shifting may for example be time domain and/or phase domain and/or frequency domain. Multiple shifts in the same domain or different domains, and/or the same interval or different intervals (differently sized intervals, for example) may be performed.

Reference signalling may have a type. Types of reference signalling may include synchronisation signalling, and/or DM-RS (used to facilitate demodulation of associated data signalling and/or control signalling), and/or PT-RS (used to facilitate phase tracking of associated data signalling and/or control signalling, e.g., within a time interval or symbol or allocation unit carrying such signalling), and/or CSI-RS (e.g., used for channel estimation and/or reporting). It may be considered that PT-RS are inserted into a bit sequence, or a modulation symbol sequence, which may represent data. For example, PT-RS may be mapped onto subcarriers of a symbol also carrying data symbols. Accordingly, PT-RS insertion may be optimised for hardware implementations. In some cases, PT-RS may be modulated differently and/or independently of the modulation symbols representing data (or data bits).

A comb structure, or short comb, may indicate a distribution, or periodic arrangement of reference signalling, in particular in frequency space, e.g., between an upper and lower frequency. A comb may pertain to one FDMA symbol and/or one (the same) symbol time interval or allocation unit. A comb may have width or size N and/or may pertain to, and/or be associated to, specific signalling and/or a type of signalling, e.g., a type of reference signalling. The width N may indicate how many empty subcarriers are between (e.g., non-neighbouring) subcarriers carrying an element or signal or symbol of the signalling (e.g., this number may be N−1), or how many empty subcarriers and non-empty subcarriers form a pattern that is repeated in frequency domain. In general, each comb may indicate that at least one empty subcarrier is to be between non-empty subcarriers. In this context, empty may refer to empty regarding the pattern or distribution of the signalling associated to the comb (and non-empty may refer to a subcarrier carrying an element or symbol of the associated signalling); in some cases, other signalings (which may have a comb structure as well) may be carried on empty subcarriers, e.g., transmitted using other transmission sources and/or other devices, and/or mapped into the comb (e.g., for a DMRS comb, data signalling may be mapped on subcarriers not carrying DMRS). A comb structure may generally describe a structure in which for every N-th (N may be an integer) resource element and/or subcarrier a reference signal or an element of a sequence of the reference signalling, and/or representing the reference signalling, and/or on which the reference signalling is based, is mapped to, and/or represented by signalling the resource element and/or subcarrier, in particular an element (symbol) of a modulation symbol sequence, or an element of a sequence. N may be called the width of the comb. Generally, the comb may indicate the periodicity of the pattern inside the frequency range of the reference signalling. The pattern may in particular pertain to one reference signal and/or resource element or subcarrier for transmitting a reference signal, such that the comb may be considered to indicate that on every N-th resource element (in particular, only there) and/or subcarrier there is to be a reference signal or element of an associated sequence, and/or how many resource elements and/or subcarriers are between resource elements and/or subcarriers with reference signals. However, there may be considered variants, in which the pattern represents more than one reference signals. The pattern may also generally represent and/or indicate one or more empty signals and/or one or more data signals (respectively associated resource elements and/or subcarriers). For each comb or comb structure with a width of N, there may be N or f(N) different available individual combs. For example, for N=2, there may be two combs shifted in frequency space by one, or an odd number, of subcarriers (e.g., based on a frequency domain offset, or a subcarrier offset). A comb structure or comb of width of N may be indicated as N-comb. Specific combs of this width may be numbered within N. For example, for a 2-comb, there may be a comb 1 (or C1) and a comb 2 (or C2), which may be shifted relative to each other, e.g., to dovetail such that all subcarrier covered by both combs carry signalling (associated to C1 and C2 alternatingly in frequency domain).

A comb may comprise two or more, for example at least three or at least four, repetitions of the pattern. The comb may indicate a reference and/or indication, e.g., a resource element and/or subcarrier, which may be related to the upper and/or lower boundary in frequency, regarding the arrangement and/or location in frequency of a first pattern, and/or the relative shift of the pattern and/or comb in frequency. Generally, a comb structure may cover at least part, and/or at least the majority, and/or essentially all or all resource elements and/or subcarriers of the plurality of resource elements and/or subcarriers, and/or the symbol.

A comb structure may result from combining two comb structures, which may in particular comb structures with pattern comprising only one reference signal. A comb structure may be determined and/or amended before transmission, e.g., based on other reference signalling to be transmitted, e.g., on a different antenna port. In this context, reference signals may be replaced by empty signals to avoid overlap and/or interference. Generally, if the other reference signalling utilises a comb structure as well, a different/new comb (as a combination of combs) may be considered to be determined, e.g., with less dense reference signal distribution and/or a different/wider pattern. Alternatively, or additionally, combs may be combined to increase the reference signal density, e.g., by combining combs with different widths, and/or with shifted offsets.

Generally, a comb structure may represent and/or comprise and/or be comprised of any of the combs/comb structures described herein.

In general, a clear channel assessment (CCA) procedure may comprise monitoring and/or performing measurements on a frequency range and/or channel and/or carrier and/or spectrum; in some cases a CCA procedure may also be referred to as LBT procedure; e.g., if only one CCA is performed for a LBT procedure. In particular, the CCA procedure may comprise determining whether a channel or frequency range or spectrum or carrier is occupied, for example based on one or more parameters, e.g., measured or monitored energy and/or power and/or signal strength and/or energy density and/or power density or similar. A CCA procedure may be performed and/or pertain to a specific time interval (also referred to as CCA duration), for example a measuring or monitoring interval over which measurement and/or monitoring is performed. The CCA procedure may be performed and/or pertain to a specific frequency range (also referred to as CCA frequency range), for example a measurement and/or monitoring range. The CCA frequency range may be part of and/or comprise the frequency range and/or carrier and/or spectrum and/or channel to be accessed (which may be referred to as access target frequency range, or access target in short; accessing in this context may be considered to refer to transmitting signalling on the range and/or carrier and/or spectrum). The CCA frequency range may be considered representative of the access target frequency range in terms of occupation status (occupied or non-occupied). A CCA procedure may indicate whether the access target is occupied or not, for example by comparing measurement results with one or more threshold values. For example, if the measured power or energy over the CCA duration is lower than an occupancy threshold, the access target may be considered unoccupied; if it reaches or is higher than the threshold, it may be considered occupied. A determination as unoccupied may be considered a positive result; a determination of occupied may be considered a negative result. A Listen-Before-Talk procedure (LBT) may comprise one or more CCA procedure in an LBT time interval, for example with the same duration and/or same condition or threshold for positive result, or with different durations and/or different conditions or thresholds. An LBT procedure may be considered positive if a threshold number of CCAs of the LBT procedure are positive, for example each or half, and/or a minimum consecutive in time are positive. A positive LBT and/or CCA procedure may allow access to the access target for transmission, for example to be accessed within an access time interval. Access (permission to transmit) may be valid for a channel occupation time (COT); the maximum time of access may be a maximum COT (M-COT). The time of access may be referred to as transmission duration (which may be as long as the M-COT or shorter). A radio node like a wireless device does not have to transmit the whole M-COT after successful CCA/LBT. It may be considered that part of the M-COT is passed on to another device, which then may transmit (using the rest of the M-COT), e.g., upon and/or based on suitable control signalling; this may be particularly useful in a centralised system. For example, in centralised system, a base station may initiate an access, transmit DL signalling to a wireless device scheduled for UL transmission such that the wireless device transmits within the M-COT after the DL transmission has ended, e.g., due to suitable scheduling information. The device performing successful access to start transmission at the beginning of a M-COT or COT may be considered the device initiating a COT or M-COT. Depending on whether there is a gap between transmissions of different device, one or more CCA procedures (in particular, shorter in total than for initiation) may have to be performed by the device taking over transmission. If a LBT procedure was unsuccessful, a device may be required to backoff (e.g., not trying to access for a backoff time interval, which may be predefined or random). Accessing and/or transmitting on an access target frequency range may comprise on the whole bandwidth of the frequency range, or on part of it, for example interleaved and/or in a contiguous part and/or utilising frequency hopping, and/or may be based on allocated and/or scheduled and/or configured resources, for example in time domain (e.g., for a number of symbols or a time interval) and/or frequency domain (e.g., as in terms of frequency subranges and/or subcarriers and/or PRBs and/or groups of PRBs assigned for transmission, e.g., allocated or scheduled or configured).

A transmission source may in particular comprise, and/or be represented by, and/or associated to, an antenna or group of antenna elements or antenna subarray or antenna array or transmission point or TRP or TP (Transmission Point) or access point. In some cases, a transmission source may be represented or representable, and/or correspond to, and/or associated to, an antenna port or layer of transmission, e.g., for multi-layer transmission. Different transmission sources may in particular comprise different and/or separately controllable antenna element/s or (sub-)arrays and/or be associated to different antenna ports and/or ports for reference signalling (e.g., such that reference signalling on different ports is shifted relative to each other, e.g., in code domain and/or cyclic shift and/or frequency domain and/or time domain, and/or is based and/or represents a different sequence root). In particular, analog beamforming may be used, with separate analog control of the different transmission sources. An antenna port may indicate a transmission source, and/or a one or more transmission parameter, in particular of reference signalling associated to the antenna port. In particular, transmission parameters pertaining to, and/or indicating a frequency domain distribution or mapping (e.g., which comb to use and/or which subcarrier or frequency offset to use, or similar) of modulation symbols of the reference signalling, and/or to which cyclic shift to use (e.g., to shift elements of a modulation symbol sequence, or a root sequence, or a sequence based on or derived from the root sequence) and/or to which cover code to use (e.g., (e.g., to shift elements of a modulation symbol sequence, or a root sequence, or a sequence based on or derived from the root sequence). In some cases, a transmission source may represent a target for reception, e.g., if it is implemented as a TRP or AP (Access Point).

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g., one or more transmission timing structures like slots or slot aggregations, and/or for one or more (e.g., specific number) of transmission/occurrences. Dynamic configuration may be based on low-level signalling, e.g., control signalling on the physical layer and/or MAC layer, in particular in the form of DCI or SCI. Periodic/semi-static may pertain to longer timescales, e.g., several slots and/or more than one frame, and/or a non-defined number of occurrences, e.g., until a dynamic configuration contradicts, or until a new periodic configuration arrives. A periodic or semi-static configuration may be based on, and/or be configured with, higher-layer signalling, in particular RCL layer signalling and/or RRC signalling and/or MAC signalling.

In this disclosure, for purposes of explanation and not limitation, specific details are set forth (such as particular network functions, processes and signalling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM) or IEEE standards as IEEE 802.11ad or IEEE 802.11 ay. While described variants may pertain to certain Technical Specifications (TSs) of the Third Generation Partnership Project (3GPP), it will be appreciated that the present approaches, concepts, and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g., a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

Abbreviation Explanation

ACK/NACK Acknowledgment/Negative Acknowledgement
ARQ Automatic Repeat reQuest
BER Bit Error Rate
BLER Block Error Rate
BPSK Binary Phase Shift Keying
BWP BandWidth Part
CAZAC Constant Amplitude Zero Cross Correlation
CB Code Block
CBG Code Block Group
CDM Code Division Multiplex
CM Cubic Metric
CORESET Control Resource Set
CP Cyclic Prefix
CPE Common Phase Error
CQI Channel Quality Information
CRC Cyclic Redundancy Check
CRS Common reference signal
CSI Channel State Information
CSI-RS Channel state information reference signal/ing
CW Codeword, encoded and/or modulated information, e.g., in a data block
DAI Downlink Assignment Indicator
DCI Downlink Control Information
DFT Discrete Fourier Transform
DFTS-FDM DFT-spread-FDM
DM(-)RS Demodulation reference signal(ing)
eMBB enhanced Mobile BroadBand
EPRE Energy Per Resource Element
FDD Frequency Division Duplex
FDE Frequency Domain Equalisation
FDF Frequency Domain Filtering
FDM Frequency Division Multiplex
FR1 Frequency Range 1, e.g., as specified by NR
FR2 Frequency Range 2, e.g., as specified by NR
HARQ Hybrid Automatic Repeat Request
IAB Integrated Access and Backhaul
ICI Inter Carrier Interference
IFFT Inverse Fast Fourier Transform
IR Impulse Response
ISI Inter Symbol Interference
MBB Mobile Broadband
MCS Modulation and Coding Scheme
MIMO Multiple-input-multiple-output
MRC Maximum-ratio combining
MRT Maximum-ratio transmission
MU-MIMO Multiuser multiple-input-multiple-output
NR 3GPP New Radio system
NR-RS NR Reference Signal (any type)
OCC Orthogonal Cover Code
OFDM/A Orthogonal Frequency Division Multiplex/Multiple Access
PAPR Peak to Average Power Ratio
PDCCH Physical Downlink Control Channel
PDSCH Physical Downlink Shared Channel
PN Phase Noise
PRACH Physical Random Access CHannel
PRB Physical Resource Block
(P)SCCH (Physical) Sidelink Control Channel
PSD Power Spectral Density
PSS Primary Synchronisation Signal(ing)
(P)SSCH (Physical) Sidelink Shared Channel
PTRS Phase Tracking RS
PUCCH Physical Uplink Control Channel
PUSCH Physical Uplink Shared Channel
QAM Quadrature Amplitude Modulation
QPSK Quadrature Phase Shift Keying
RAN Radio Access Network
RAT Radio Access Technology
RB Resource Block
RNTI Radio Network Temporary Identifier
RRC Radio Resource Control
RS Reference Signal
RSRP Received Signal Receive Power
RSRQ Received Signal Received Quality
RX Receiver, Reception, Reception-related/side
SA Scheduling Assignment
SC-FDE Single Carrier Frequency Domain Equalisation
SC-FDM/A Single Carrier Frequency Division Multiplex/Multiple Access
SCI Sidelink Control Information
SINR Signal-to-interference-plus-noise ratio
SIR Signal-to-interference ratio
SNR Signal-to-noise-ratio
SR Scheduling Request
SRS Sounding Reference Signal(ing)
SSS Secondary Synchronisation Signal(ing)
SVD Singular-value decomposition
TB Transport Block
TCI Transmission Configuration Indicator
TDD Time Division Duplex
TDM Time Division Multiplex
TRP Transmission Point, Transmission/Reception Point
TRS Tracking RS
TX Transmitter, Transmission, Transmission-related/side
UCI Uplink Control Information
UE User Equipment
URLLC Ultra Low Latency High Reliability Communication
VL-MIMO Very-large multiple-input-multiple-output
ZF Zero Forcing
ZP Zero-Power, e.g., muted CSI-RS symbol Abbreviations may be considered to follow 3G PP usage if applicable.

The invention claimed is:

1. A method of operating a feedback radio node in a radio access network, the method comprising:
   transmitting feedback signalling representing an encoded sequence of bits, the encoded sequence of bits representing a sequence of feedback information bits, the sequence of feedback information bits comprising a plurality of subpatterns, each subpattern having a type of a set of types, the set of types comprising a first type and a second type, the subpatterns being ordered in the sequence according to their type, the feedback signalling being based at least in part on a number of physical downlink control channel (PDCCH) monitoring occasion pairs in which a valid downlink scheduling message is detected; and
   when a number of scheduled physical downlink shared channels (PDSCHs) is less than a maximum number of PDSCHs, unused bits of the feedback information bits are padded with non-acknowledgement (NACK) bits being of the first type of subpattern, and NACK bits pertaining to scheduled PDSCH transmissions being of the second type of subpattern.

2. The method according to claim 1, wherein the encoded sequence of bits is based on a non-systematic coding applied on the sequence of feedback information bits.

3. The method according to claim 1, wherein subpatterns of the first type are arranged before subpatterns of the second type in the sequence of feedback information bits.

4. The method according to claim 1, wherein the first type corresponds to padding bits.

5. The method according to claim 1, wherein the subpatterns are ordered in the sequence of feedback bits based on a coding.

6. The method according to claim 1, wherein subpatterns of one type are associated to different scheduling assignments.

7. The method according to claim 1, wherein at least one subpattern associated to one scheduling assignment has the first type, and at least one subpattern associated to the scheduling assignment has the second type.

8. The method according to claim 1, wherein the number of PDCCH monitoring occasion pairs is cumulative.

9. The method according to claim 1, wherein the number of PDCCH monitoring occasion pairs is a maximum number of PDCCH scheduled by a single downlink message.

10. A feedback radio node for a radio access network, the feedback radio node being configured to:
    transmit feedback signalling representing an encoded sequence of bits, the encoded sequence of bits representing a sequence of feedback information bits, the sequence of feedback information bits comprising a plurality of subpatterns, each subpattern having a type of a set of types, the set of types comprising a first type and a second type, the subpatterns being ordered in the sequence according to their type, the feedback signalling being based at least in part on a number of physical downlink control channel (PDCCH) monitoring occasion pairs in which a valid downlink scheduling message is detected; and
    when a number of scheduled physical downlink shared channels (PDSCHs) is less than a maximum number of PDSCHs, unused bits of the feedback information bits are padded with non-acknowledgement (NACK) bits being of the first type of subpattern, and NACK bits pertaining to scheduled PDSCH transmissions being of the second type of subpattern.

11. A method of operating a signalling radio node in a radio access network, the method comprising receiving feedback signalling representing an encoded sequence of bits, the encoded sequence of bits being longer than the sequence of feedback information bits, the sequence of feedback information bits comprising a plurality of subpatterns, each subpattern having a type of a set of types, the set of types comprising a first type and a second type, the subpatterns being ordered in the sequence according to their type, the feedback signaling being based at least in part on a number of physical downlink control channel (PDCCH) monitoring occasion pairs in which a valid downlink scheduling message is detected; and
    when a number of scheduled physical downlink shared channels (PDSCHs) is less than a maximum number of PDSCHs, unused bits of the feedback information bits are padded with non-acknowledgement (NACK) bits being of the first type of subpattern, and NACK bits pertaining to scheduled PDSCH transmissions being of the second type of subpattern.

12. The method according to claim 11, wherein the encoded sequence of bits is based on a non-systematic coding applied on the sequence of feedback information bits.

13. The method according to claim 11, wherein subpatterns of the first type are arranged before subpatterns of the second type in the sequence of feedback information bits.

14. The method according to claim 11, wherein the first type corresponds to padding bits.

15. The method according to claim 11, wherein the feedback information bits represent a codebook.

16. The method according to claim 11, wherein the subpatterns are ordered in the sequence of feedback bits based on a coding.

17. The method according to claim 11, wherein subpatterns of one type are associated to different scheduling assignments.

18. A signalling radio node for a radio access network, the signalling radio node being configured to:
    receive feedback signalling representing an encoded sequence of bits, the encoded sequence of bits representing a sequence of feedback information bits, the sequence of feedback information bits comprising a plurality of subpatterns, each subpattern having a type of a set of types, the set of types comprising a first type and a second type, the subpatterns being ordered in the sequence according to their type, the feedback signalling being based at least in part on a number of physical downlink control channel (PDCCH) monitoring occasion pairs in which a valid downlink scheduling message is detected; and
    when a number of scheduled physical downlink shared channels (PDSCHs) is less than a maximum number of PDSCHs, unused bits of the feedback information bits are padded with non-acknowledgement (NACK) bits being of the first type of subpattern, and NACK bits pertaining to scheduled PDSCH transmissions being of the second type of subpattern.

19. A non-transitory computer storage medium storing an executable computer program comprising instructions that when executed cause processing circuitry to at least one of control and perform a method of operating a feedback radio node in a radio access network, the method comprising:
    transmitting feedback signalling representing an encoded sequence of bits, the encoded sequence of bits representing a sequence of feedback information bits, the sequence of feedback information bits comprising a plurality of subpatterns, each subpattern having a type of a set of types, the set of types comprising a first type and a second type, the subpatterns being ordered in the sequence according to their type, the feedback signaling being based at least in part on a number of physical downlink control channel (PDCCH) monitoring occasion pairs in which a valid downlink scheduling message is detected; and when a number of scheduled physical downlink shared channels (PDSCHs) is less than a maximum number of PDSCHs, unused bits of the feedback information bits are padded with non-acknowledgement (NACK) bits being of the first type of subpattern, and NACK bits pertaining to scheduled PDSCH transmissions being of the second type of subpattern.

* * * * *